US008825518B2

(12) United States Patent
Levy

(10) Patent No.: US 8,825,518 B2
(45) Date of Patent: Sep. 2, 2014

(54) MEDIA METHODS AND SYSTEMS

(75) Inventor: Kenneth L. Levy, Stevenson, WA (US)

(73) Assignee: Digimarc Corporation, Beaverton, OR (US)

(*) Notice: Subject to any disclaimer, the term of this patent is extended or adjusted under 35 U.S.C. 154(b) by 639 days.

(21) Appl. No.: 12/331,129

(22) Filed: Dec. 9, 2008

(65) Prior Publication Data
US 2009/0158318 A1 Jun. 18, 2009

Related U.S. Application Data

(62) Division of application No. 10/028,751, filed on Dec. 21, 2001.

(60) Provisional application No. 60/257,822, filed on Dec. 21, 2000.

(51) Int. Cl.
G06Q 30/00 (2012.01)

(52) U.S. Cl.
USPC .......................................... 705/14

(58) Field of Classification Search
USPC .......................................... 705/14
See application file for complete search history.

(56) References Cited

U.S. PATENT DOCUMENTS

| 5,233,654 A | 8/1993 | Harvey |
| 5,450,490 A | 9/1995 | Jensen et al. |
| 5,577,266 A | 11/1996 | Takahisa et al. |
| 5,703,795 A | 12/1997 | Mankovitz |
| 5,708,478 A | 1/1998 | Tognazzini |
| 5,721,827 A | 2/1998 | Logan |
| 5,745,604 A | 4/1998 | Rhoads |
| 5,748,763 A | 5/1998 | Rhoads |
| 5,768,426 A | 6/1998 | Rhoads |
| 5,778,192 A | 7/1998 | Schuster et al. |
| 5,809,317 A | 9/1998 | Kogan |
| 5,841,978 A | 11/1998 | Rhoads |
| 5,848,396 A * | 12/1998 | Gerace ............................ 705/10 |
| 5,850,481 A | 12/1998 | Rhoads |
| 5,860,074 A | 1/1999 | Rowe et al. |
| 5,862,260 A | 1/1999 | Rhoads |
| 5,889,868 A | 3/1999 | Moskowitz et al. |
| 5,923,627 A | 7/1999 | Miwa |
| 5,973,731 A | 10/1999 | Schwab |
| 6,002,443 A | 12/1999 | Iggulden |

(Continued)

FOREIGN PATENT DOCUMENTS

| WO | WO 00/54453 | 9/2000 |
| WO | WO 00/58883 | 10/2000 |

(Continued)

OTHER PUBLICATIONS

Info World, "Vendors Unveil Web-Site Monitoring Solution", Oct. 21, 1996, p. 39.*

(Continued)

Primary Examiner — Alvin L Brown

(57) ABSTRACT

Several novel watermarking and fingerprinting applications—and related improvements—are disclosed. Some relate to advertising. These include techniques for replacing broadcast advertising with other advertising; inserting advertising based on a viewer's ad-viewing history; triggering insertion of advertising based on fingerprint data derived from compressed video content; and discontinuing advertising when a threshold amount of advertising has apparently been viewed. A great number of other features and technologies are also detailed.

22 Claims, 5 Drawing Sheets

(56) References Cited

U.S. PATENT DOCUMENTS

| | | | |
|---|---|---|---|
| 6,026,193 A | 2/2000 | Rhoads | |
| 6,028,960 A | 2/2000 | Graf et al. | |
| 6,115,741 A | 9/2000 | Domenikos et al. | |
| 6,122,392 A | 9/2000 | Rhoads | |
| 6,122,403 A | 9/2000 | Rhoads | |
| 6,177,931 B1 | 1/2001 | Alexander et al. | |
| 6,201,879 B1 | 3/2001 | Bender et al. | |
| 6,219,787 B1 | 4/2001 | Brewer | |
| 6,229,924 B1 | 5/2001 | Rhoads et al. | |
| 6,266,430 B1 | 7/2001 | Rhoads | |
| 6,285,776 B1 | 9/2001 | Rhoads | |
| 6,289,108 B1 | 9/2001 | Rhoads | |
| 6,307,949 B1 | 10/2001 | Rhoads | |
| 6,311,214 B1 | 10/2001 | Rhoads | |
| 6,330,335 B1 | 12/2001 | Rhoads | |
| 6,343,138 B1 | 1/2002 | Rhoads | |
| 6,345,104 B1 | 2/2002 | Rhoads | |
| 6,353,672 B1 | 3/2002 | Rhoads | |
| 6,363,159 B1 | 3/2002 | Rhoads | |
| 6,381,341 B1 | 4/2002 | Rhoads | |
| 6,385,329 B1 | 5/2002 | Sharma et al. | |
| 6,389,151 B1 | 5/2002 | Carr et al. | |
| 6,400,827 B1 | 6/2002 | Rhoads | |
| 6,404,898 B1 | 6/2002 | Rhoads | |
| 6,408,082 B1 | 6/2002 | Rhoads et al. | |
| 6,421,070 B1 | 7/2002 | Ramos et al. | |
| 6,424,725 B1 | 7/2002 | Rhoads et al. | |
| 6,430,302 B2 | 8/2002 | Rhoads | |
| 6,442,285 B2 | 8/2002 | Rhoads et al. | |
| 6,449,377 B1 | 9/2002 | Rhoads | |
| 6,449,379 B1 | 9/2002 | Rhoads | |
| 6,496,591 B1 | 12/2002 | Rhoads | |
| 6,505,160 B1 | 1/2003 | Levy et al. | |
| 6,516,079 B1 | 2/2003 | Rhoads et al. | |
| 6,519,352 B2 | 2/2003 | Rhoads | |
| 6,522,769 B1 | 2/2003 | Rhoads et al. | |
| 6,522,770 B1 | 2/2003 | Seder et al. | |
| 6,522,771 B2 | 2/2003 | Rhoads | |
| 6,535,617 B1 | 3/2003 | Hannigan et al. | |
| 6,535,618 B1 | 3/2003 | Rhoads | |
| 6,539,095 B1 | 3/2003 | Rhoads | |
| 6,542,618 B1 | 4/2003 | Rhoads | |
| 6,542,620 B1 | 4/2003 | Rhoads | |
| 6,542,927 B2 | 4/2003 | Rhoads | |
| 6,553,129 B1 | 4/2003 | Rhoads | |
| 6,553,178 B2 * | 4/2003 | Abecassis | 386/83 |
| 6,560,349 B1 | 5/2003 | Rhoads | |
| 6,560,350 B2 | 5/2003 | Rhoads | |
| 6,567,533 B1 | 5/2003 | Rhoads | |
| 6,567,534 B1 | 5/2003 | Rhoads | |
| 6,567,535 B2 | 5/2003 | Rhoads | |
| 6,567,780 B2 | 5/2003 | Rhoads | |
| 6,574,350 B1 | 6/2003 | Rhoads et al. | |
| 6,580,808 B2 | 6/2003 | Rhoads | |
| 6,580,819 B1 | 6/2003 | Rhoads | |
| 6,587,821 B1 | 7/2003 | Rhoads | |
| 6,590,996 B1 | 7/2003 | Reed et al. | |
| 6,590,997 B2 | 7/2003 | Rhoads | |
| 6,611,607 B1 | 8/2003 | Davis et al. | |
| 6,614,914 B1 | 9/2003 | Rhoads et al. | |
| 6,647,128 B1 | 11/2003 | Rhoads | |
| 6,647,129 B2 | 11/2003 | Rhoads | |
| 6,647,130 B2 | 11/2003 | Rhoads | |
| 6,650,761 B1 | 11/2003 | Rodriguez et al. | |
| 6,654,480 B2 | 11/2003 | Rhoads | |
| 6,654,887 B2 | 11/2003 | Rhoads | |
| 6,675,146 B2 | 1/2004 | Rhoads | |
| 6,681,028 B2 | 1/2004 | Rodriguez et al. | |
| 6,681,029 B1 | 1/2004 | Rhoads | |
| 6,684,249 B1 | 1/2004 | Frerichs | |
| 6,694,042 B2 | 2/2004 | Seder et al. | |
| 6,694,043 B2 | 2/2004 | Seder et al. | |
| 6,700,990 B1 | 3/2004 | Rhoads | |
| 6,700,995 B2 | 3/2004 | Reed | |
| 6,701,062 B1 | 3/2004 | Talstra | |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,724,912 B1 | 4/2004 | Carr et al. |
| 6,738,495 B2 | 5/2004 | Rhoads et al. |
| 6,744,907 B2 | 6/2004 | Rhoads |
| 6,750,985 B2 | 6/2004 | Rhoads |
| 6,754,377 B2 | 6/2004 | Rhoads |
| 6,757,406 B2 | 6/2004 | Rhoads |
| 6,760,463 B2 | 7/2004 | Rhoads |
| 6,763,123 B2 | 7/2004 | Reed et al. |
| 6,768,808 B2 | 7/2004 | Rhoads |
| 6,768,809 B2 | 7/2004 | Rhoads et al. |
| 6,771,796 B2 | 8/2004 | Rhoads |
| 6,775,392 B1 | 8/2004 | Rhoads |
| 6,778,682 B2 | 8/2004 | Rhoads |
| 6,798,894 B2 | 9/2004 | Rhoads |
| 6,804,376 B2 | 10/2004 | Rhoads et al. |
| 6,804,379 B2 | 10/2004 | Rhoads |
| 6,813,366 B1 | 11/2004 | Rhoads |
| 6,829,368 B2 | 12/2004 | Meyer et al. |
| 6,850,626 B2 | 2/2005 | Rhoads et al. |
| 6,879,701 B1 | 4/2005 | Rhoads |
| 6,882,738 B2 | 4/2005 | Davis et al. |
| 6,917,724 B2 | 7/2005 | Seder et al. |
| 6,920,232 B2 | 7/2005 | Rhoads |
| 6,944,298 B1 | 9/2005 | Rhoads |
| 6,947,571 B1 | 9/2005 | Rhoads et al. |
| 6,959,100 B2 | 10/2005 | Rhoads |
| 6,959,143 B2 | 10/2005 | Dupuis et al. |
| 6,959,386 B2 | 10/2005 | Rhoads |
| 6,965,682 B1 | 11/2005 | Davis et al. |
| 6,965,683 B2 | 11/2005 | Hein, III |
| 6,970,573 B2 | 11/2005 | Carr et al. |
| 6,973,669 B2 | 12/2005 | Daniels |
| 6,975,746 B2 | 12/2005 | Davis et al. |
| 6,978,036 B2 | 12/2005 | Alattar et al. |
| 6,983,051 B1 | 1/2006 | Rhoads |
| 6,987,862 B2 | 1/2006 | Rhoads |
| 6,988,202 B1 | 1/2006 | Rhoads et al. |
| 6,993,152 B2 | 1/2006 | Patterson et al. |
| 6,993,284 B2 | 1/2006 | Weinblatt et al. |
| 6,996,252 B2 | 2/2006 | Reed et al. |
| 7,003,132 B2 | 2/2006 | Rhoads |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,051,086 B2 | 5/2006 | Rhoads et al. |
| 7,054,462 B2 | 5/2006 | Rhoads et al. |
| 7,054,463 B2 | 5/2006 | Rhoads et al. |
| 7,054,465 B2 | 5/2006 | Rhoads |
| 7,055,166 B1 | 5/2006 | Logan |
| 7,062,069 B2 | 6/2006 | Rhoads |
| 7,076,084 B2 | 7/2006 | Davis et al. |
| 7,095,871 B2 | 8/2006 | Jones et al. |
| 7,111,168 B2 | 9/2006 | Lofgren et al. |
| 7,111,170 B2 | 9/2006 | Rhoads et al. |
| 7,113,614 B2 | 9/2006 | Rhoads |
| 7,113,615 B2 | 9/2006 | Rhoads et al. |
| 7,123,740 B2 | 10/2006 | McKinley |
| 7,130,087 B2 | 10/2006 | Rhoads |
| 7,139,408 B2 | 11/2006 | Rhoads et al. |
| 7,142,691 B2 | 11/2006 | Levy |
| 7,158,654 B2 | 1/2007 | Rhoads |
| 7,164,780 B2 | 1/2007 | Brundage et al. |
| 7,171,016 B1 | 1/2007 | Rhoads |
| 7,171,018 B2 | 1/2007 | Rhoads et al. |
| 7,174,031 B2 | 2/2007 | Rhoads et al. |
| 7,177,443 B2 | 2/2007 | Rhoads |
| 7,181,022 B2 | 2/2007 | Rhoads |
| 7,184,570 B2 | 2/2007 | Rhoads |
| 7,185,201 B2 | 2/2007 | Rhoads et al. |
| 7,188,186 B1 | 3/2007 | Meyer |
| 7,206,820 B1 | 4/2007 | Rhoads |
| 7,213,757 B2 | 5/2007 | Jones et al. |
| 7,224,819 B2 | 5/2007 | Levy et al. |

(56) References Cited

U.S. PATENT DOCUMENTS

| | | |
|---|---|---|
| 7,239,734 B2 | 7/2007 | Alattar et al. |
| 7,242,790 B2 | 7/2007 | Rhoads |
| 7,248,717 B2 | 7/2007 | Rhoads |
| 7,261,612 B1 | 8/2007 | Hannigan et al. |
| 7,263,203 B2 | 8/2007 | Rhoads et al. |
| 7,266,217 B2 | 9/2007 | Rhoads et al. |
| 7,269,275 B2 | 9/2007 | Carr et al. |
| 7,286,684 B2 | 10/2007 | Rhoads et al. |
| 7,289,643 B2 | 10/2007 | Brunk et al. |
| 7,302,574 B2 | 11/2007 | Conwell et al. |
| 7,305,104 B2 | 12/2007 | Carr et al. |
| 7,305,117 B2 | 12/2007 | Davis et al. |
| 7,308,110 B2 | 12/2007 | Rhoads |
| 7,313,251 B2 | 12/2007 | Rhoads |
| 7,313,253 B2 | 12/2007 | Davis et al. |
| 7,319,775 B2 | 1/2008 | Sharma et al. |
| 7,321,667 B2 | 1/2008 | Stach |
| 7,330,564 B2 | 2/2008 | Brundage et al. |
| 7,333,957 B2 | 2/2008 | Levy et al. |
| 7,340,076 B2 | 3/2008 | Stach et al. |
| 7,349,552 B2 | 3/2008 | Levy et al. |
| 7,359,528 B2 | 4/2008 | Rhoads |
| 7,369,676 B2 | 5/2008 | Hein, III |
| 7,369,678 B2 | 5/2008 | Rhoads |
| 7,372,976 B2 | 5/2008 | Rhoads et al. |
| 7,377,421 B2 | 5/2008 | Rhoads |
| 7,391,880 B2 | 6/2008 | Reed et al. |
| 7,406,214 B2 | 7/2008 | Rhoads et al. |
| 7,415,129 B2 | 8/2008 | Rhoads |
| 7,418,111 B2 | 8/2008 | Rhoads |
| 7,424,131 B2 | 9/2008 | Alattar et al. |
| 7,424,132 B2 | 9/2008 | Rhoads |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,499,564 B2 | 3/2009 | Rhoads |
| 7,502,759 B2 | 3/2009 | Hannigan et al. |
| 7,505,605 B2 | 3/2009 | Rhoads et al. |
| 7,508,955 B2 | 3/2009 | Carr et al. |
| 7,515,733 B2 | 4/2009 | Rhoads |
| 7,532,741 B2 | 5/2009 | Stach |
| 7,536,034 B2 | 5/2009 | Rhoads et al. |
| 7,536,555 B2 | 5/2009 | Rhoads |
| 7,537,170 B2 | 5/2009 | Reed et al. |
| 7,539,325 B2 | 5/2009 | Rhoads et al. |
| 7,545,951 B2 | 6/2009 | Davis et al. |
| 7,545,952 B2 | 6/2009 | Brundage et al. |
| 7,548,643 B2 | 6/2009 | Davis et al. |
| 7,555,139 B2 | 6/2009 | Rhoads et al. |
| 7,562,392 B1 | 7/2009 | Rhoads et al. |
| 7,564,992 B2 | 7/2009 | Rhoads |
| 7,565,294 B2 | 7/2009 | Rhoads |
| 7,567,686 B2 | 7/2009 | Rhoads |
| 7,570,784 B2 | 8/2009 | Alattar |
| RE40,919 E | 9/2009 | Rhoads |
| 7,587,601 B2 | 9/2009 | Levy et al. |
| 7,587,602 B2 | 9/2009 | Rhoads |
| 7,590,259 B2 | 9/2009 | Levy et al. |
| 7,593,576 B2 | 9/2009 | Meyer et al. |
| 7,602,940 B2 | 10/2009 | Rhoads et al. |
| 7,602,977 B2 | 10/2009 | Rhoads et al. |
| 7,602,978 B2 | 10/2009 | Levy et al. |
| 7,606,390 B2 | 10/2009 | Rhoads |
| 7,607,016 B2 | 10/2009 | Brunk et al. |
| 7,628,320 B2 | 12/2009 | Rhoads |
| 7,639,837 B2 | 12/2009 | Carr et al. |
| 7,643,649 B2 | 1/2010 | Davis et al. |
| 7,650,009 B2 | 1/2010 | Rhoads |
| 7,650,010 B2 | 1/2010 | Levy et al. |
| 7,653,210 B2 | 1/2010 | Rhoads |
| 7,657,058 B2 | 2/2010 | Sharma |
| 7,672,477 B2 | 3/2010 | Rhoads |
| 7,676,059 B2 | 3/2010 | Rhoads |
| 7,685,426 B2 | 3/2010 | Ramos et al. |
| 7,689,532 B1 | 3/2010 | Levy |
| 7,693,300 B2 | 4/2010 | Reed et al. |
| 7,697,719 B2 | 4/2010 | Rhoads |
| 7,702,511 B2 | 4/2010 | Rhoads |
| 7,711,143 B2 | 5/2010 | Rhoads |
| 7,711,564 B2 | 5/2010 | Levy et al. |
| 7,720,249 B2 | 5/2010 | Rhoads |
| 7,720,255 B2 | 5/2010 | Rhoads |
| 7,724,919 B2 | 5/2010 | Rhoads |
| 7,738,673 B2 | 6/2010 | Reed |
| 7,747,037 B2 | 6/2010 | Hein, III |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,756,892 B2 | 7/2010 | Levy |
| 7,760,905 B2 | 7/2010 | Rhoads et al. |
| 7,761,327 B1 | 7/2010 | Hannah |
| 7,762,468 B2 | 7/2010 | Reed et al. |
| 7,787,653 B2 | 8/2010 | Rhoads |
| 7,788,686 B1 | 8/2010 | Andrews |
| 7,792,325 B2 | 9/2010 | Rhoads et al. |
| 7,796,826 B2 | 9/2010 | Rhoads et al. |
| 7,822,225 B2 | 10/2010 | Alattar |
| 7,831,062 B2 | 11/2010 | Stach |
| 7,837,094 B2 | 11/2010 | Rhoads |
| 7,916,354 B2 | 3/2011 | Rhoads |
| 7,930,546 B2 | 4/2011 | Rhoads et al. |
| 7,936,900 B2 | 5/2011 | Rhoads |
| 7,945,781 B1 | 5/2011 | Rhoads |
| 7,949,147 B2 | 5/2011 | Rhoads et al. |
| 7,949,149 B2 | 5/2011 | Rhoads et al. |
| 7,953,270 B2 | 5/2011 | Rhoads |
| 7,953,824 B2 | 5/2011 | Rhoads et al. |
| 7,957,553 B2 | 6/2011 | Ellingson et al. |
| 7,961,949 B2 | 6/2011 | Levy et al. |
| 7,965,864 B2 | 6/2011 | Davis et al. |
| 7,966,494 B2 | 6/2011 | Rhoads |
| 7,970,166 B2 | 6/2011 | Carr et al. |
| 7,970,167 B2 | 6/2011 | Rhoads |
| 2001/0022848 A1 | 9/2001 | Rhoads |
| 2001/0034654 A1* | 10/2001 | Vigil et al. ........................ 705/14 |
| 2001/0034705 A1 | 10/2001 | Rhoads et al. |
| 2001/0041053 A1* | 11/2001 | Abecassis ........................ 386/83 |
| 2001/0044744 A1 | 11/2001 | Rhoads |
| 2001/0053234 A1 | 12/2001 | Rhoads |
| 2001/0054086 A1* | 12/2001 | Miyahira ........................ 709/218 |
| 2001/0055407 A1 | 12/2001 | Rhoads |
| 2002/0009208 A1 | 1/2002 | Alattar et al. |
| 2002/0012446 A1 | 1/2002 | Tanaka |
| 2002/0026362 A1 | 2/2002 | Tanaka |
| 2002/0033844 A1 | 3/2002 | Levy et al. |
| 2002/0042920 A1 | 4/2002 | Thomas et al. |
| 2002/0052885 A1 | 5/2002 | Levy |
| 2002/0072982 A1 | 6/2002 | Barton |
| 2002/0080995 A1 | 6/2002 | Rhoads |
| 2002/0092017 A1 | 7/2002 | Klosterman et al. |
| 2002/0131076 A1 | 9/2002 | Davis |
| 2002/0136429 A1 | 9/2002 | Stach et al. |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0012548 A1 | 1/2003 | Levy et al. |
| 2003/0021440 A1 | 1/2003 | Rhoads |
| 2003/0040957 A1 | 2/2003 | Rhoads et al. |
| 2003/0051252 A1 | 3/2003 | Miyaoku |
| 2003/0056103 A1 | 3/2003 | Levy et al. |
| 2003/0105730 A1 | 6/2003 | Davis et al. |
| 2003/0130954 A1 | 7/2003 | Carr et al. |
| 2003/0138128 A1 | 7/2003 | Rhoads |
| 2003/0192060 A1 | 10/2003 | Levy |
| 2004/0005093 A1 | 1/2004 | Rhoads |
| 2004/0057581 A1 | 3/2004 | Rhoads |
| 2004/0073950 A1 | 4/2004 | Tan et al. |
| 2004/0181671 A1 | 9/2004 | Brundage et al. |

(56) References Cited

U.S. PATENT DOCUMENTS

| | | |
|---|---|---|
| 2004/0190750 A1 | 9/2004 | Rodriguez et al. |
| 2004/0240704 A1 | 12/2004 | Reed |
| 2004/0263911 A1 | 12/2004 | Rodriguez et al. |
| 2004/0264733 A1 | 12/2004 | Rhoads et al. |
| 2005/0041835 A1 | 2/2005 | Reed et al. |
| 2005/0056700 A1 | 3/2005 | McKinley et al. |
| 2005/0058318 A1 | 3/2005 | Rhoads |
| 2005/0111723 A1 | 5/2005 | Hannigan et al. |
| 2005/0166224 A1* | 7/2005 | Ficco ............................ 725/35 |
| 2005/0192933 A1 | 9/2005 | Rhoads et al. |
| 2005/0210526 A1 | 9/2005 | Levy et al. |
| 2005/0251683 A1 | 11/2005 | Levy et al. |
| 2006/0013435 A1 | 1/2006 | Rhoads |
| 2006/0028689 A1 | 2/2006 | Perry et al. |
| 2006/0041591 A1 | 2/2006 | Rhoads |
| 2006/0062386 A1 | 3/2006 | Rhoads |
| 2006/0136399 A1 | 6/2006 | Conwell et al. |
| 2006/0251291 A1 | 11/2006 | Rhoads |
| 2006/0253330 A1* | 11/2006 | Maggio et al. .................. 705/14 |
| 2006/0282319 A1* | 12/2006 | Maggio ........................... 705/14 |
| 2007/0016790 A1 | 1/2007 | Brundage et al. |
| 2007/0027818 A1 | 2/2007 | Lofgren et al. |
| 2007/0033409 A1 | 2/2007 | Brunk et al. |
| 2007/0055884 A1 | 3/2007 | Rhoads |
| 2007/0100757 A1 | 5/2007 | Rhoads |
| 2007/0101147 A1 | 5/2007 | Brunk |
| 2007/0108287 A1 | 5/2007 | Davis et al. |
| 2007/0172098 A1 | 7/2007 | Rhoads et al. |
| 2007/0174059 A1 | 7/2007 | Rhoads et al. |
| 2007/0177761 A1 | 8/2007 | Levy |
| 2007/0180251 A1 | 8/2007 | Carr et al. |
| 2007/0183623 A1 | 8/2007 | McKinley et al. |
| 2007/0185840 A1 | 8/2007 | Rhoads |
| 2007/0195987 A1 | 8/2007 | Rhoads |
| 2007/0201835 A1 | 8/2007 | Rhoads |
| 2007/0250194 A1 | 10/2007 | Rhoads et al. |
| 2007/0250716 A1 | 10/2007 | Rhoads et al. |
| 2007/0276841 A1 | 11/2007 | Rhoads et al. |
| 2007/0276928 A1 | 11/2007 | Rhoads et al. |
| 2008/0014917 A1 | 1/2008 | Rhoads |
| 2008/0049971 A1 | 2/2008 | Ramos et al. |
| 2008/0052783 A1 | 2/2008 | Levy |
| 2008/0109242 A1* | 5/2008 | Shear et al. ........................ 705/1 |
| 2008/0121728 A1 | 5/2008 | Rodriguez |
| 2008/0131083 A1 | 6/2008 | Rhoads |
| 2008/0131084 A1 | 6/2008 | Rhoads |
| 2008/0133416 A1 | 6/2008 | Rhoads |
| 2008/0133555 A1 | 6/2008 | Rhoads et al. |
| 2008/0133556 A1 | 6/2008 | Conwell et al. |
| 2008/0134342 A1* | 6/2008 | Shamoon et al. ................ 726/27 |
| 2008/0140573 A1 | 6/2008 | Levy et al. |
| 2008/0140714 A1 | 6/2008 | Rhoads |
| 2008/0149713 A1 | 6/2008 | Brundage |
| 2008/0215636 A1 | 9/2008 | Lofgren et al. |
| 2008/0253740 A1 | 10/2008 | Rhoads |
| 2008/0275906 A1 | 11/2008 | Rhoads et al. |
| 2008/0292134 A1 | 11/2008 | Sharma et al. |
| 2008/0319859 A1 | 12/2008 | Rhoads |
| 2009/0012944 A1 | 1/2009 | Rodriguez et al. |
| 2009/0089586 A1 | 4/2009 | Brunk et al. |
| 2009/0089587 A1 | 4/2009 | Brunk et al. |
| 2009/0123023 A1 | 5/2009 | Hein |
| 2009/0125475 A1 | 5/2009 | Rhoads et al. |
| 2009/0138484 A1 | 5/2009 | Ramos et al. |
| 2009/0158318 A1 | 6/2009 | Levy |
| 2009/0177742 A1 | 7/2009 | Rhoads et al. |
| 2009/0252401 A1 | 10/2009 | Davis et al. |
| 2009/0286572 A1 | 11/2009 | Rhoads et al. |
| 2009/0290754 A1 | 11/2009 | Rhoads |
| 2010/0008534 A1 | 1/2010 | Rhoads |
| 2010/0008536 A1 | 1/2010 | Rhoads |
| 2010/0008537 A1 | 1/2010 | Rhoads |
| 2010/0008586 A1 | 1/2010 | Meyer et al. |
| 2010/0009722 A1 | 1/2010 | Levy et al. |
| 2010/0021004 A1 | 1/2010 | Rhoads |
| 2010/0027969 A1 | 2/2010 | Alattar |
| 2010/0036881 A1 | 2/2010 | Rhoads et al. |
| 2010/0045816 A1 | 2/2010 | Rhoads |
| 2010/0046744 A1 | 2/2010 | Rhoads et al. |
| 2010/0062819 A1 | 3/2010 | Hannigan et al. |
| 2010/0119108 A1 | 5/2010 | Rhoads |
| 2010/0131767 A1 | 5/2010 | Rhoads |
| 2010/0138012 A1 | 6/2010 | Rhoads |
| 2010/0142752 A1 | 6/2010 | Rhoads et al. |
| 2010/0146285 A1 | 6/2010 | Rhoads et al. |
| 2010/0163629 A1 | 7/2010 | Rhoads et al. |
| 2010/0172540 A1 | 7/2010 | Davis et al. |
| 2010/0185306 A1 | 7/2010 | Rhoads |
| 2010/0198941 A1 | 8/2010 | Rhoads |
| 2010/0226525 A1 | 9/2010 | Levy et al. |
| 2010/0281545 A1 | 11/2010 | Levy |
| 2010/0322035 A1 | 12/2010 | Rhoads et al. |
| 2010/0329506 A1 | 12/2010 | Hein, III |
| 2011/0007936 A1 | 1/2011 | Rhoads |
| 2011/0026777 A1 | 2/2011 | Rhoads et al. |
| 2011/0051998 A1 | 3/2011 | Rhoads |
| 2011/0058707 A1 | 3/2011 | Rhoads et al. |
| 2011/0062229 A1 | 3/2011 | Rhoads |
| 2011/0091066 A1 | 4/2011 | Alattar |
| 2011/0110555 A1 | 5/2011 | Stach |
| 2011/0225046 A1* | 9/2011 | Eldering et al. ........... 705/14.53 |
| 2012/0130719 A1* | 5/2012 | Petrovic et al. ................ 704/275 |
| 2012/0226553 A1* | 9/2012 | Torres ........................ 705/14.54 |
| 2012/0284126 A1* | 11/2012 | Giraud et al. .............. 705/14.66 |
| 2012/0304220 A1* | 11/2012 | Reynolds et al. ................ 725/28 |
| 2013/0097030 A1* | 4/2013 | Ferber et al. ............. 705/14.73 |
| 2013/0294754 A1* | 11/2013 | Beach et al. .................. 386/296 |

FOREIGN PATENT DOCUMENTS

| | | |
|---|---|---|
| WO | WO 00/70523 | 11/2000 |
| WO | WO 00/70585 | 11/2000 |
| WO | WO 01/01331 | 1/2001 |
| WO | WO 01/55889 | 8/2001 |

OTHER PUBLICATIONS

U.S. Appl. No. 08/154,866, filed Nov. 18, 1993, Geoffrey B. Rhoads.
U.S. Appl. No. 08/215,289, filed Mar. 17, 1994, Geoffrey B. Rhoads.
U.S. Appl. No. 09/150,147, filed Sep. 9, 1998, Geoffrey B. Rhoads.
U.S. Appl. No. 09/151,492, filed Sep. 11, 1998, Bruce L. Davis, et al.
U.S. Appl. No. 09/337,590, filed Jun. 21, 1999, Geoffrey B. Rhoads.
U.S. Appl. No. 09/343,101, filed Jun. 29, 1999, Bruce L. Davis, et al.
U.S. Appl. No. 09/343,104, filed Jun. 29, 1999, Tony F. Rodriguez, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/491,534, filed Jan. 26, 2000, Bruce L. Davis, et al.
U.S. Appl. No. 09/496,380, filed Feb. 2, 2000, Geoffrey B. Rhoads.
U.S. Appl. No. 09/507,096, filed Feb. 17, 2000, Geoffrey B. Rhoads, et al.
U.S. Appl. No. 09/515,826, filed Feb. 29, 2000, Geoffrey B. Rhoads.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/574,726, filed May 18, 2000, Geoffrey B. Rhoads.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/636,102, filed Aug. 10, 2000, Daniel O. Ramos, et al.
U.S. Appl. No. 09/689,289, filed Oct. 11, 2000, Geoffrey B. Rhoads, et al.
U.S. Appl. No. 09/697,015, filed Oct. 25, 2000, Bruce L Davis, et al.
U.S. Appl. No. 09/697,009, filed Oct. 25, 2000, Bruce L. Davis, et al.
U.S. Appl. No. 13/084,981, filed Apr. 12, 2011, Geoffrey B. Rhoads.

* cited by examiner

MEDIA METHODS AND SYSTEMS

RELATED APPLICATION DATA

This application is a division of application Ser. No. 10/028,751, filed Dec. 21, 2001, which claims priority to provisional application 60/257,822, filed Dec. 21, 2000.

(This specification is longer than that of the parent, due to the literal incorporation of certain materials (including appendices A and B) that were formerly only incorporated by reference.)

FIELD OF THE INVENTION

The present disclosure memorializes various improvements and applications relating to media content, digital watermarking and fingerprinting.

BACKGROUND OF THE INVENTION

Digital watermarking is the science of encoding physical and electronic objects with plural-bit digital data, in such a manner that the data is essentially hidden from human perception, yet can be recovered by computer analysis. In physical objects, the data may be encoded in the form of surface texturing, or printing. Such marking can be detected from optical scan data, e.g., from a scanner or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present assignee's U.S. Pat. Nos. 6,122,403 and 6,614,914 are illustrative of certain watermarking technologies.

Watermarking can be used to tag objects with a persistent digital identifier, and as such finds myriad uses. Some are in the realm of device control—e.g., tagging video data with a do-not-copy flag that is respected by compliant video recorders. (The music industry's Secure Digital Music Initiative (SDMI), and the motion picture industry's Copy Protection Technical Working Group (CPTWG), are working to establish standards relating to watermark usage for device control.) Other watermark applications are in the field of copyright communication, e.g., indicating that an audio track is the property of a particular copyright holder.

Other watermark applications encode data that serves to associate an object with a store of related data. For example, an image watermark may contain an index value that serves to identify a database record specifying (a) the owner's name; (b) contact information; (c) license terms and conditions, (d) copyright date, (e) whether adult content is depicted, etc., etc. (The present assignee's MarcCentre service provides such functionality.) Related are so-called "connected content" applications, in which a watermark in one content object (e.g., a printed magazine article) serves to link to a related content object (e.g., a web page devoted to the same topic). The watermark can literally encode an electronic address of the related content object, but more typically encodes an index value that identifies a database record containing that address information. U.S. Pat. No. 6,947,571 details a number of connected-content applications and techniques.

One problem that arises in many watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The assignee's U.S. Pat. Nos. 6,614,914 and 6,408,082 detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

With the foregoing by way of background, the specification next turns to the various improvements. It will be recognized that these improvements can typically be employed in many applications, and in various combinations with the subject matter of the patent documents cited herein.

BRIEF DESCRIPTION OF THE DRAWINGS

Illustrative embodiments will hereafter be described with reference to the accompanying drawings.

DETAILED DESCRIPTION

Fingerprint Technology

Figures 1, 2:
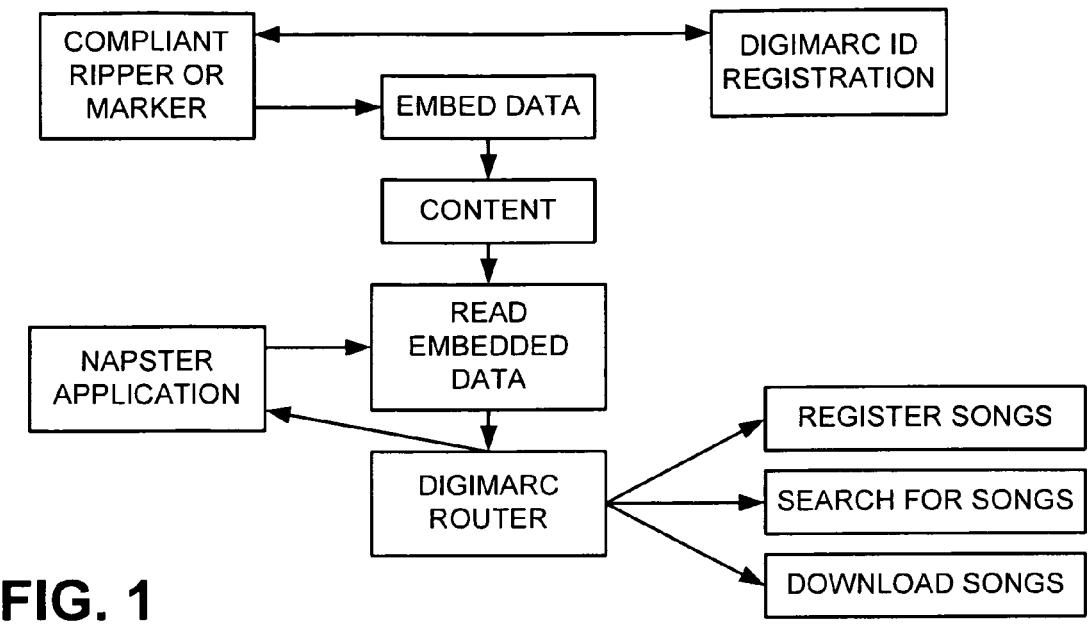
FIG. 1 is a diagram illustrating a peer-to-peer system in accordance with an illustrative embodiment.
FIG. 2 is a diagram illustrating a watermark payload and the format of an associated database record in accordance with an illustrative embodiment.

One way of identifying audio and video content—apart from watermarks—is so-called "fingerprint" technology. As detailed in numerous published references, such technology generally works by characterizing content by some process that usually—although not necessarily—yields a unique data string. Innumerable ways can be employed to generate the data string. What is important is (a) its relative uniqueness, and (2) its relatively small size. Thus a 1 Mbyte audio file may be distilled down to a 2 Kbyte identifier.

(One technique of generating a fingerprint—seemingly not known in the art—is to select frames (video or MP3, etc.) pseudo randomly, based on a known key, and then performing a hashing or other lossy transformation process on the frames thus selected.)

One longstanding application of such technology has been in monitoring play-out of radio advertising. Advertisements are "fingerprinted," and the results stored in a database. Monitoring stations then process radio broadcasts looking for audio that has one of the fingerprints stored in the database. Upon finding a match, play-out of a given advertisement is confirmed.

Some fingerprinting technology may employ a "hash" function to yield the fingerprint. Others may take, e.g., the most significant bit of every $10^{th}$ sample value to generate a fingerprint. Etc. A problem arises, however, if the content is distorted. In such case, the corresponding fingerprint may be distorted too, wrongly failing to indicate a match.

In accordance with this aspect of the present technology, content is encoded with a steganographic reference signal by which such distortion can be identified and quantized. If the reference data in a radio broadcast indicates that the audio is temporally scaled (e.g., by tape stretch, or by psycho-acoustic broadcast compression technology), the amount of scaling can be determined. The resulting information can be used to compensate the audio before fingerprint analysis is performed. That is, the sensed distortion can be backed-out before the fingerprint is computed. Or the fingerprint analysis process can take the known temporal scaling into account when deriving the corresponding fingerprint. Likewise with distorted image and video. By such approaches, fingerprint technology is made a more useful technique.

(U.S. Pat. No. 6,408,082 details such a reference signal (sometimes termed a "grid" signal), and its use in identifying and quantizing distortion. U.S. Pat. No. 6,512,837 details various fingerprint techniques.)

In a variant system, a watermark payload—in addition to the steganographic reference signal—is encoded with the content. Thus, the hash (or other fingerprint) provides one identifier associated with the content, and the watermark provides another. Either can be used, e.g., to index related information (such as connected content). Or they can be used jointly, with the watermark payload effectively extending the ID conveyed by the hash (or vice versa).

A technique similar to that detailed above can be used in aiding pattern recognition. Consider services that seek to identify image contents, e.g., internet porn filtering, finding a particular object depicted among thousands of frames of a motion picture, or watching for corporate trademarks in video media. (Cobion, of Kassel, Germany, offers some such services.) Pattern recognition can be greatly for-shortened if the orientation, scale, etc., of the image are known. Consider the Nike swoosh trademark. It is usually depicted in horizontal orientation. However, if an image incorporating the swoosh is rotated 30 degrees, its recognition is made more complex.

To redress this situation, the original image can be steganographically encoded with a grid (calibration) signal as detailed in the '023 application. Prior to performing any pattern recognition on the image, the grid signal is located, and indicates that the image has been rotated 30 degrees. The image can then be counter-rotated before pattern recognition is attempted.

Fingerprint technology can be used in conjunction with watermark technology in a variety of ways.

One is to steganographically convey a digital object's fingerprint as part of a watermark payload. If the watermark-encoded fingerprint does not match the object's current fingerprint, it indicates the object has been altered.

A watermark can also be used to trigger extraction of an object's fingerprint (and associated action based on the fingerprint data). Thus, one bit of a watermark payload, may signal to a compliant device that it should undertake a fingerprint analysis of the object.

In other arrangements, the fingerprint detection is performed routinely, rather than triggered by a watermark. In such case, the watermark can specify an action that a compliant device should perform using the fingerprint data. (In cases where a watermark triggers extraction of the fingerprint, a further portion of the watermark can specify a further action.) For example, if the watermark bit has a "0" value, the device may respond by sending the fingerprint to a remote database; if the watermark bit has a "1" value, the fingerprint is stored locally.

Still further, frail watermarks can be used in conjunction with fingerprint technology. For example, if a frail watermark is detected, then a fingerprint analysis is performed; else not. And/or, the results of a fingerprint analysis can be utilized in accordance with information conveyed by a frail watermark.

(Frail watermarks are disclosed, e.g., in U.S. Pat. Nos. 6,636,615, 6,332,031, 6,714,683, 6,683,966 and 6,694,041, and in application Ser. Nos. 09/234,780 (a continuation of which has issued as U.S. Pat. No. 6,332,031), 60/198,138, 60/232,163, and 60/247,389.)

Watermarks in Video and Broadcast Programming

Several novel uses of watermarks relate to video and broadcast programming. For example, a watermark may be placed at a certain location in content (e.g., audio or video), and serve to trigger insertion or play of an advertisement. Conditional rules can be specified (e.g., play advertisement X if the current hour is between 9:00 p.m. and 5:00 a.m.; play advertisement Y if the current hour is between 5:00 a.m. and 9:00 p.m.).

Another is to charge differently for content, depending on whether or not it is rendered with advertisements included. For example, if a viewer fast-forwards through advertising in a video program, then a charge is assessed for the viewing. Else no charge (or a reduced charge) is assessed. (A related concept is disclosed in application Ser. No. 09/337,590, filed Jun. 21, 1999.)

Watermarks (e.g., watermark advertising triggers) may be counted by a system and, when a threshold of number or types of watermarks detected is reached, playback of specific advertising or other material is completed. Thus, if a viewer has apparently watched five advertisements, no more advertisements are inserted for a predetermined period (or through the end of the current content). Or if the viewer has watched two automobile ads (or two Ford ads), no further automobile ads will be presented. (Conversely, the viewer's willingness to watch automobile ads may indicate that such ads should be inserted in preference to another class of ads over which the viewer habitually fast-forwards or otherwise does not view, e.g., for financial service institutions.) In addition, the watermark may have a date-time stamp, or time counter that can help determine how long the content has been playing. For example, the user may have started viewing at 2000 seconds, and at 2600 seconds, or 10 minutes of viewing, an advertisement is triggered.

A variation of this concept involves personalized advertisement delivery triggered by watermarks. For example, advertisements tailored to particular consumer profiles (e.g., based on zip codes or other known general or specific demographic information) may be downloaded to a Tivo-like Personal Video Recorder (PVR) through known video sources (e.g., a set top box, coupled to cable, satellite, etc.). These tailored advertisements can be inserted based upon detection of specific watermark triggers (e.g., akin to how local advertising is inserted in national network programming). Or generic advertising already included in the content can be watermarked and, if a tailored advertisement is locally stored and has a corresponding watermark, it can be substituted for the generic advertisement. Or after three generic advertisements, a personalized advertisement may be inserted. Many other such variations are naturally possible.

Instead of caching tailored advertising in a Tivo-like device, such advertising can be distributed otherwise. One example is a DVD video disk mailed to the consumer. Playback of advertising from this disk can be triggered by watermark signals in other content, and—as above—can benefit the consumer by reduced cost- or free-viewing of otherwise premium content.

Instead of substituting locally-stored advertising in externally received content, the opposite arrangement can be employed. A DVD video, a PVR replay, etc., can be periodically interrupted (based on watermark trigger signals), and advertising from another source (e.g., cable, wireless, etc.) may be inserted.

The advertising can be tailored to the viewer, or can be tailored to the programming. Thus, for example, programming showing a golf tournament may be so-indicated by a watermark, and this watermark can thereby signal that golf-related advertising should be inserted. (The watermark may convey an index value that is associated—through a remote data store—with the programming subject, or the watermark may literally convey a code corresponding to the programming subject.)

Playback of advertising may enable access to other content or capabilities. This can occur by requiring a number or type of watermark to be read (e.g., beginning/middle/end) before viewing of other content is permitted (akin to requiring theatre-goers to watch trailers for upcoming movies before viewing the featured movie). Once the watermarks are detected from the requisite advertisements, then the viewer is permitted to access additional content, or exercise other capabilities.

A secondary watermark (in addition to a primary content owner or creator watermark) can be employed to enable broadcasters, cable operators, content aggregators, etc., to add connected content functionality—directing users back to pre-arranged web sites, etc. (e.g., a web site maintained by the broadcaster, aggregator, etc.). Such functionality may be in addition to the simultaneous linking capabilities available to the content owner/creator's web site). Set top boxes, DVD/CD players or other devices can be able to detect both types of watermarks, and route users to either class of destination based on predetermined rules or customer preference.

Connected Content and Peer-to-Peer Sharing

It is not clear that Napster-like sharing of movies will be as popular as such sharing of audio. Regardless, it seems watermarking can play an important role.

Unlike audio, most people are not accustomed to "owning" a movie. Instead, rental or PPV is the dominant user experience.

One particular approach is to provide the content data for free, and assess a charge for its playback (rendering). The charge can be triggered upon detection of a watermark.

A watermark can also be used for connected-content purposes. One such application permits the user to obtain (e.g., download) movies and songs that are mentioned, or relate to, the video content being viewed. The watermark can be conveyed in the audio track, and/or the video content (or each could include one or more different marks). In one scenario, a device like that disclosed in application Ser. No. 09/476,686 (filed Dec. 30, 1999) is used to listen to ambient sound, and decode any watermark in such sound. When a watermark is detected indicating, e.g., that the viewer is watching the movie Mission Impossible, the device and related software can search for related content. This can be accomplished, e.g., by using an index value conveyed by the watermark to access a store of meta data associated with the movie. That store can contain the title of the movie, titles of pre-quels, sequels, names of stars, name of the movie director, geographic locations featured, featured music, etc. A catalog of available audio and/or video can then be searched in accordance with such meta data to identify related content. The results of the search can be presented to the viewer, who can choose one or more for linking. Alternatively, instead of searching based on keywords, a data store associated with the watermark index value can directly identify related content, e.g., by title and web address. Again, this information can be presented to the user for further linking. A great variety of other such arrangements are naturally possible.

In some such arrangements, the connected content does not have a sole, known source. Instead, it may be located in a peer-to-peer media sharing service, akin to Napster, and downloaded from whatever source the user—or some computer-executed procedure—dictates.

Likewise, the original source video may be obtained by the user from a peer-to-peer network (e.g., like a video-Napster). Again, the content may be obtained for free, and a charge levied only when the content is viewed. This charge can be triggered by watermark detection, or using various non-watermark techniques. The charge may be fixed, but can alternatively be on a per-increment of viewing (e.g., a nickel charged for every 5 minutes rendered to the user). Still further, the content can be provided in streaming form, rather than as one or more discrete files.

In this and many content delivery systems, streaming can be used as an alternative to file transfer when the recipient's rights to have a file copy of the content cannot be confirmed.

The advantage of a peer-to-peer architecture is that a massive central server needn't serve the requests of all possible users. Instead, this function is spread over a widely distributed network, providing consumers with a service that is faster and—potentially—less expensive.

Connected Content and Advertising

Another concept is to include connected-ads within (as opposed to interrupting) the entertainment. If someone "clicks" on (or during) the ad, or otherwise activates same, then they receive money towards watching the TV show. If someone doesn't want to click on the ad, they pay for the show. The ads are linked to information via watermarks.

For example, if Ross in the TV show Friends is drinking a Coke during the show, then clicking during that time will present the viewer with linking options, one of which is viewing the web page of Coke. It will be identified that this is an advertising link, possibly with an ad credit symbol such as a $. If the user clicks on this option, they will receive some benefit, such as x cents deducted from their monthly TV bill.

Thus, if they want to watch TV without ads, they just don't click on ads and pay more for the monthly TV bill.

Alternatively, the user could click on the ad link and bookmark it for usage at a later time, at which time the user would receive their credit. In addition, if different video objects are marked with different watermarks, then clicking on the Coke can take the user directly to the ad page, or bookmark same for future use.

One advantage of this approach over traditional ad models is that the consumer can decide how much advertising to watch and pay accordingly, while watching the same show as other consumers who want advertising. In other words, you don't need different shows and channels, such as a premium show and related channel and a free show and related channel.

While watermarks are preferred in this application to convey data related to the connected content (e.g., advertising), other known data transmission mechanisms can be used (e.g., Multicast IP, vertical blanking interval-based systems, file headers in MPEG, etc.).

Different on-screen signals (icons, etc.) can be used to indicate to the viewer that advertising/information/money saving opportunities exist for the viewer, and that the viewer can earn credits towards purchasing merchandise by watching the ad or viewing more information (akin to GreenStamps for those old enough to remember them). To continue the Coke idea, clicking on the Coke can on the TV could print a coupon for $0.50 off a 6 pack of Coke at 7 Eleven.

Watermarks in Media Customization and Control; Age-Based Systems

Another application of watermark is in tailoring audio or video content presented to consumers, e.g., withholding adult materials from juvenile audiences.

A rating field, such as two bits (X, R, PG, and G), can be included in the watermark payload and identify the rating of the corresponding content on a per-video-frame (or per-audio-excerpt). The watermark reader (optionally using read-ahead capabilities) can cause the rendering device to act appropriately for non-appropriate content, such as removing adult rated-X frames. If the watermark also contains a unique ID, a secondary database can be consulted to determine the network location of alternate frames/excerpts that can then be substituted for the objectionable content. If no ID is present, default filler material can be substituted, either from a remote source, or from the consumer's own data stores (e.g., a TiVo device).

Detection of the adult content watermark bit(s) can be performed by the consumer device, or upstream in the content distribution network (e.g., in a hub, firewall, router, server, operating system, etc.) Many corporations will want the firewall to detect the adult content so that employees don't waste company time and money on viewing inappropriate materials. In addition, viewing adult content, such as pornography or violent scenes, can produce internal human resource legal problems for corporations.

While adult content is one class of content, the use of watermarks to categorize content, e.g., for filtering purposes, finds other applications as well. One is indexing. Content can be watermarked with data indicating content classification (or with an ID that permits its content to be ascertained by checking a corresponding database record). Search engines can then index content based during web crawling.

The concept is that the watermark categorizes the content. Systems then use the watermark to make content specific decisions, like sorting, indexing, controlling playback, etc. The systems can be filters at various stages—operating system, driver, application, firewall, router, etc. The systems can be search engines or crawlers, etc.

In systems like Digimarc's Image Commerce system, in which content providers pay an annual fee so they can watermark a unique identifier into their content (which identifier permits customers to link back to the content's source), the fee can be waived for adult content. Instead of including a unique ID, the watermark payload can include a default ID. If customers link using the default ID, they are routed to a default page shared by all, e.g., adult content providers. The advantage, of course, is that a financial cost associated with watermarking is waived for such content, hopefully assisting in the ubiquitous "adult" marking of objectionable content.

(Related disclosure can be found in application Ser. Nos. 09/636,102 and 09/706,505.)

Identification documents, such as drivers' licenses, credit cards, and other identity tokens, can include a watermark that encodes—or otherwise represents—the holder's birthdate. By displaying the document to a web camera and associated application, the birthdate can be decoded and used to authorize viewing, e.g., of R-rated content. This card can also be used to confirm a user's age for online gambling. In addition, the birthdate can allow a user to obtain pornography and gambling, anonymously while enabling the site owner to not have to worry about under age participants.

The birth date can also include an ID that can be used to identify the person needs to be identified, such as for online voting or access to restricted information on the web.

The card could be something mailed to the person after verifying their birth date, and identification if a user ID is included. The card could even be emailed and printed by the end user, although copying such a card will be easier.

Finally, the card may save the birth date via other methods, such as on a magnetic strip or through smart card chip technology, or with a combination of technologies, including watermark. The card may also contain a frail watermark such that a duplicate can be detected.

More on Peer-to-Peer Systems

A further concept is the integration of watermark data into peer-to-peer (e.g., Napster-like) systems.

Referring to FIG. 1, the top 3 boxes correspond to an embedding part of the system. The embedded bits may fall into various classes, e.g.:

Copyright/Subscription level bits or protocol (e.g., 1-3 bits)
  In a free subscription system, these bits can provide copyright notification and control. They may also provide preview and/or stream capabilities, permitting the viewer to buy a copy of the content.
  In a pay subscription system, these bits can be used to track royalty payments (e.g., when including Unique ID bits)
Date stamp bits (e.g., 16 bits)
  Allows content to enter different parts (tiers or levels) of the file-sharing system over time, so as to maximize profitability (e.g., as done with video releases)
Unique ID bits (payload) per song (e.g., 24-32 bits)
Connected content and e-commerce opportunities
  Buy paraphernalia and other similar music
  More information about artist
  Improved searching since know song uniquely
Retail Channel bits (e.g., 12-16 bits)
  Optionally connect to same retail channel as song was originally purchased These bits are desirably embedded repetitively and continuously throughout a song. The bit payload at the beginning of a song may be different from that at the end (either in the specified bits, or others), permitting the watermark to serve as a receipt of complete downloading.

This watermark payload, and the format of an associated database record, is shown in FIG. 2.

Figure 3:
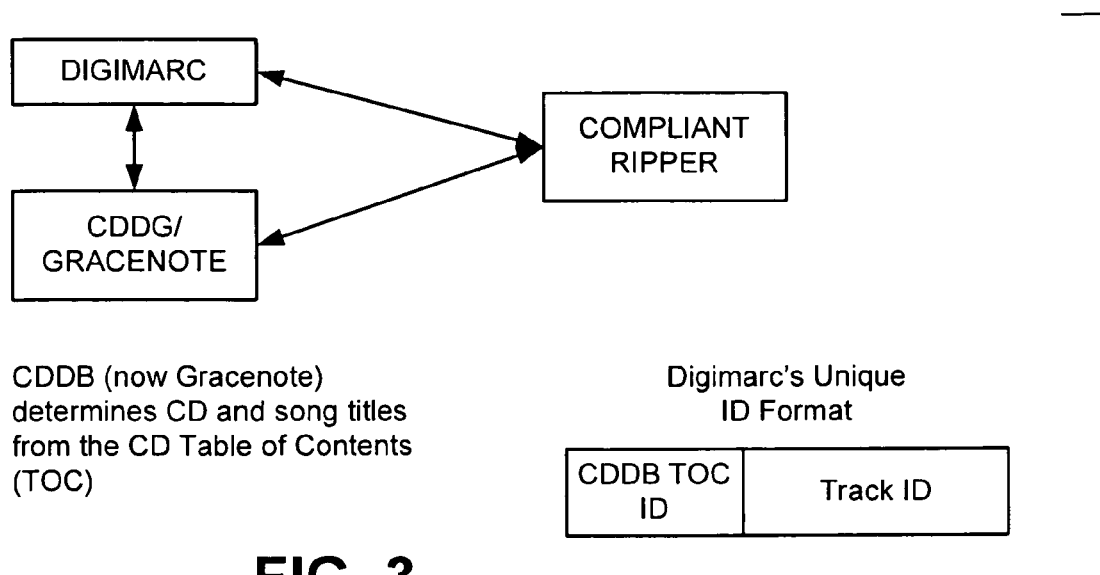
FIG. 3 is a diagram illustrating an arrangement for generating a unique ID based on a CDDB database in accordance with an illustrative embodiment.

The Unique ID may be automatically generated based on the content (e.g., fingerprint-like), or it can be specified by the owner of the content. The CDDB database (now termed Gracenote) can provide CD and song titles from the Table of Contents data read from a CD, and this information can be used in generating an ID. FIG. 3 shows such an arrangement.

Today, MP3 content owners, such as Emusic.com, and MP3.com can embed their songs with copyright bits that control file sharing without audibility issues, and can additionally embed unique IDs that can be used to connect content back to the retailers and the artist's web site for increased e-commerce options. In the future, watermarks will be embedded in most digital audio and remain in compressed files. While watermarked data is preferred because it is format independent, header data and the like can also be employed. The latter, for example, could be used by content owners to embed data in each frame header of MP3 files.

On the user side, when the user registers a song on the hard drive, the user's Napster-like application tells the central database:
Song is reliable if embedded data exists and is continuous
Copyright and subscription level of song
Song title, album, artist, etc., optionally obtained from Digimarc's web server
In the future, look for watermark and trans-watermark or embed data in frame header
When the user searches for songs, the database can quickly
Display "reliable" icon for watermarked songs (increasing the user's confidence in safety)
Display Label (helps determine if good song, especially for smaller or classical labels)
Determine which songs the user is allowed to access, and which are available for purchase (display options set by user; user not confused by seeing files they cannot access)
When the user downloads a song, the user's Napster-like application can
Double check that the embedded data is continuous, if supposed to be present (drastically reducing sabotage by substituting songs on uploading computers)
Double check that the embedded data allows sharing
Check that complete file is downloaded (and optionally providing download receipt)
Use the identification and Digimarc's web server to track songs for rights organizations, and provide additional e-commerce opportunities from the original retailer and artist's web site Although not discussed in detail, it is understood that the foregoing arrangement employs a remote database, or other data repository, to store the ancillary information.

(Other disclosure of peer-to-peer network technology, and watermark usage therein, is provided in application Ser. No. 09/620,019.)

Watermarks and Media Distribution

The following section details particular watermark-related actions that can be utilized when distributing digital content.

1. Identify (ID) content with watermark
2. Use watermarked ID to trigger automated purchase and file transfer operation from source to user's machine, digital locker, etc. (e.g., press button while listening to song to trigger transaction), may include some notions of digital money transaction (see, e.g., application Ser. No. 09/337,590)
3. Embed ID in an automated fashion on users' machines: search for content on drive, look up ID from local or network database (with either fingerprint or TOC type indicators), embed ID into content
4. Embed ID at time of rip, where the file transfer "client" (which acts as both client and server) includes read/write functionality. The write function can be used for supplementing previous embedding by content owner or ripper software (see, e.g., U.S. Pat. No. 6,505,160 <the specification of which is attached as Appendix A> and U.S. Pat. No. 6,970,886). During download, adding the unique ID from a fingerprint and secondary second database.
5. Check file for proper naming, labeling before adding to file sharing registry of content items (songs)
6. Update a listing of name—ID mapping, increment registry in real time
7. Mark file with user's ID during a download, then if user attempts to add to a file sharing system, the system knows the user and informs them how the user can and cannot use the file; e.g., refuse registration
8. Distinguish level of service in subscription service by watermark label (see, e.g., application Ser. No. 09/620,019)
9. check integrity of file: free of content bombs and viruses (see, e.g., application Ser. No. 09/620,019; the entire specification of application Ser. No. 09/620,019 is attached as Appendix B)
10. Use date-time stamp to control changing of rights over time (see, e.g., application 60/232,163). The date time stamp can be referenced to Jan. 1, 2000 and incremented from there, possibly in seconds or minutes.
11. During transfer of a content object (e.g., by streaming or file transfer), a fingerprint or meta-tag obtained from the object can be parsed from the in-transfer object and used as an ID to access a database record. The database record can contain pre-existing information that can be read by the client device (e.g., to ascertain permitted usage rights). Or the database record can be written, e.g., with the date, time, username, etc., relating to the transfer.
12. Audio excerpts (e.g., individual MP3 frames) can be hashed (e.g., yielding 16 bits). This hash code can be used to modulate bits—making it more difficult to change the audio.
13. Different beginning and ending frame payloads to determine successful download, or have header with number of frames and make sure matches.
14. Stream the content when the user does not have rights to download
15. Hash audio in each frame to two bytes and use to modulate bits because it makes it more difficult to change the audio without detecting this in the header or watermark ID.
16. Choose frames or data within frames randomly, based upon a PN sequence to make it more difficult to change audio without detecting this in the header or watermark ID.
17. Branding the label by presenting the label's logo each time the audio is played or downloaded.
18. Linking back to the retailer where you bought the music for connected-content apps with file sharing, possibly while downloading the content or while playing the content.
19. Automatically generating the ID from the TOC ID and track ID.

Multiply-Watermarked Video

U.S. Pat. No. 6,411,725 details how different video "objects" within a frame (e.g., as utilized in MPEG4) can be separately watermarked.

As a further extension, consider two different types of watermarking techniques. One type is a "background" watermark that essentially is fixed in reference system relative to the overall frame. It may move as the overall scene moves, or just sit there fixed. The other type of watermark travels with MPEG4 objects.

In the latter system, there can also be a watermark which explicitly moves with an object, but always re-watermarks itself as a function of the global frame reference. In other words, even as an object moves relative to the global frame reference, so too can its watermark signal adapt, so that the overall global watermark is uniform across the frame.

These two systems are not necessarily mutually exclusive. With two watermarks being applied, one level can remain essentially fixed, painting the whole frame, while the other follows individual object patches and may contain object-specific watermarks.

One such approach ties an MPEG4 object locator reference coordinate system into the subliminal grid (calibration signal) detailed in U.S. Pat. No. 6,408,082.

Device Control Watermarks

It is believed that watermarks will first find widespread deployment in audio and video markets as part of copy control system (e.g., the watermark may signal to a compliant consumer device, "Do not Copy," "Copy Once," or "Copy Freely," etc.). Many other applications of watermarking may then follow (e.g., "connected content" applications).

The watermark detection system in the consumer device can be implemented in hardware or software. However, it may be advantageous to have a split arrangement, e.g., with the copy control watermark being detected by hardware, and the connected content watermark being detected by software.

The circuitry to detect the copy control watermark may be comparatively simple, since the copy control watermark payload is relatively small (e.g., 1-8 bits). Speed is important in this application to assure that useful clips of media are not wrongfully copied. The software to detect the other, added functionality, software, in comparison, can be relatively complex—both to handle a longer watermark payload, and to perform more complex response actions.

In some embodiments, hardware circuitry can detect merely the presence of a watermark, but not decode it. The presence of the watermark can signal something about the media signal (e.g., that it should not be copied, or it is adult content), or may simply trigger the further step of a watermark reading operation (e.g., reading a copy control watermark, or an added functionality watermark). The presence of the watermark can be detected by various means, including detection of the calibration signal disclosed in U.S. Pat. No. 6,408,082, or by sensing some other signal attribute.

Extended payloads have been proposed so as to enable additional functionality (e.g., specifying internet addresses to which consumers can link for additional content or information, specifying the number of times a video can be viewed, specifying the period of time in which an audio selection can be played, specifying database records in which metadata associated with the content (including any of the foregoing information) may be stored, etc.)

As such, watermark decoding is performed by two decoders. A first, hardware, decoder, is used to read a first set of bits (typically associated with copy control functionality). A second, software, decoder, is used to read a second set of payload bits (typically associated with extended functionality that does not involve basic copy control operations).

Typically, although not necessarily, the two watermarks payloads are conveyed by two distinct watermarks, using different watermarking algorithms or different key (noise) data (i.e., they are not simply different bits of a single watermark). The two watermarks may be applied to the content sequentially, or in a single operation.

An advantage to the above-described approach is security. Software is easier to reverse engineer than hardware. A hacker who reverse-engineers a software decoder to interfere with the extended payload, and associated functionality, does not thereby compromise the hardware detector, and the associated copy control functionality. Moreover, if different watermarking algorithms are used, information gleaned in reverse-engineering the extended watermark or its software decoder does not compromise the security of the copy control watermark or its hardware decoder.

This approach also reduces the gate count of the hardware decoder—an important consideration in mass produced consumer electronic devices. Moreover, it permits the same hardware to be employed in a range of different products—products that are differentiated by software-provided functionality.

This approach can be used with both audio and video content. Moreover, it is also applicable to still image content, including conventional graphic files (e.g., JPEG'd photographs) and scanner data corresponding to paper documents (e.g., generated by a photocopier).

Marking Collectibles and Other Physical Objects

Some applications can employ watermark technology both for connected content/linking purposes, and for security/authenticity checking as well. Consider collectable sports paraphernalia as one example. (The same principles are naturally applicable on a much broader basis.)

It has been proposed that such paraphernalia be watermarked to assign each item a unique number (e.g., of a limited edition). Such marking can be effected by texturing (e.g., by engraving, etc.), printing (e.g., by silk-screen or otherwise, etc.). To assure that such marking isn't copied onto counterfeit articles, it desirably uses a watermark that does not survive copying (so-called "frail" watermarking). Examples of such frail watermarking are shown in the patents and applications cited above.

The process may work as follows:

1. Company X embeds 500 baseballs with 500 unique watermarks/id's.
2. The baseballs are distributed to retail outlets and sold.
3. The baseballs are packaged with material explaining what the watermark is and how it works.
4. The buyer opens the package and holds the baseball up to a web cam.
5. The default site for this is the "Register Your Mike McGuire Baseball" (or whatever) page.
6. After the buyer registers the baseball they are sent to a new page that is the provenance page for the baseball.
7. Since all watermarks/baseballs are unique, each time going forward the buyer holds up the ball he/she goes to the page that says "Yep this one is real."
8. Company X changes the destination page to which that baseball thereafter links (e.g., by changing the entry in a redirection database).

UV Ink Arrangements

Certain printing contexts pose special challenges for digital watermarking. A case in point is certain product packaging, which may use a spot color fill over the entire package and may be inked by only one plate in the printing process. In this case, the variations in the printing needed to convey the watermark might be effected only by small areas that are devoid of ink. This is unsatisfactory in various applications.

To redress this, the watermarking can be effected using UV ink. Some of the UV spectrum is detected by the CCD or CMOS detector of most cameras under normal lighting. The effect can be enhanced by illuminating the object with black light in order to fluoresce the mark at the time of imaging—making the mark visible to the user and the camera.

Such an arrangement is well suited for in-store kiosks where a black light can be positioned with the camera. The kiosk may be arranged to that the user never sees the black light-illuminated UV watermark since it will be facing away from them as they present the watermark to the camera.

There are two different types of UV inks.

The first, and more generally applicable, type of UV ink is a conventional printing ink—used like other inks. Such inks typically fluoresce blue, orange, yellow and green. Various usages are possible. One is to print just the UV ink, with no normal ink below it, so the media appears unprinted. Another is to overprint other ink (e.g., conventional package markings) with the UV ink. Yet another is to print the UV ink over an un-watermarked flood of black or other ink. Still another is to print one watermark using conventional ink, and overprint on it a second watermark pattern using UV ink. The second watermark pattern can be the same as the first pattern, or different (e.g., conveying the same watermark payload, or a different one).

The second type of UV ink is a lacquer that is commonly used for protecting images—typically outdoors like billboards, corrugated containers and other signage—from sun damage. This coating is put on after the object is printed, e.g., as a totally separate process, and then cures for some amount of time. Such lacquers are fairly viscous, forming relatively thick coatings. The thickness of the coating can be locally varied to change the surface topology of the object and thereby encode a watermark. For example, the lacquer can be uniformly applied in a first coat. Then a second, patterned, coat can be applied, depositing lacquer in some regions, and depositing none in others. With even a difference of a few microns, sufficient optical (and UV) distinctions can be detected between the regions to permit decoding of a watermark. (While the arrangement just described yields a binary watermark—with pels either "on" or "off"—similar techniques can be employed to effect a gray-scale-like encoding (e.g., by depositing lacquer in a range of intermediate thicknesses in different regions).

Earlier disclosure relating to use of UV inks is provided in copending application Ser. No. 09/562,516. U.S. Pat. No. 5,850,481 includes claims directed to texturing the microtopology of a surface to convey a watermark.

Layered Arrangements

The example just-given focused on UV inks and coatings as means to convey watermarks. The latter-discussed concept of applying different layers of material to encode a watermark, however, is applicable with materials other than UV inks. Any material that can be selectively deposited or printed to yield a controllable surface texture can similarly be applied. The scale of the surface texture, and component pel size, is application dependent. (Pel here refers to a pixel-like component that may be utilized in certain watermarks, e.g., in forming rectangular patterns that can be tiled over a surface. Such arrangements are further detailed, e.g., in U.S. Pat. No. 5,862,260 and other references cited above.)

Moreover, the local variations can be effected by selectively removing or indenting a material, rather than simply adding a supplemental material.

To apply materials, various known ink printing technologies can be employed. On a smaller scale, techniques such as chemical vapor deposition can be utilized. To selectively remove or indent materials, techniques such as etching (chemical or plasma) and engraving can be used. Photolithography on photosensitive media, with subsequent development and removal of exposed (or unexposed) areas are other options.

The use of high-pressure intaglio techniques to texture paper is disclosed in laid-open application WO 200045344 and in U.S. Pat. No. 6,345,104.

Watermarks and Cinema

Watermarking has many uses in the field of Digital Cinema. Some work is being done in this field by the Digital Cinema working group of the Society of Motion Picture and Television Engineers (SMPTE).

In one arrangement, a watermark is dynamically embedded in the video, in the pipeline of data to projector, thus embedding information such as a) what video disc or other media is this (each piece of media may have a unique identifier so that movie distributors can track them) b) what theater the current projector belongs to, and c) what time and date the movie is being shown. Future digital camcorders etc. could have a watermark reader chip in them, and when it detects a watermark in the scene it is filming, the camera could prevent recording. For older camcorders which would not have this hardware, the presence of these unique id's allows authorities to determine at exactly what theater the illegal filming took place. Since many of the pirated movies are taken from the projector booth so as to get a clean line of sight of the film, and to tap into superior audio, the date and time data could be used to determine who was running that projector when the illegal copy was made.

In another arrangement, watermarking can be effected in the auditorium (e.g., for showtime/location serialization, etc.) by use of a slide with a variable transparency in front of the projector. Desirably, this wouldn't be put in front of the lens, as this is near the conjugate plan of the optical system, and unless the watermark is purely in the Fourier domain, much would be lost. Generally the watermark added signal should be in the focal plane. This is the least expensive approach and easy to change often. These two advantages are important because Digital Cinemas don't want to spend any extra money, especially on content protection that may degrade quality. Furthermore some digital cinema set-ups use a digitally controlled gate in the focal plane of the projector. The local watermark can then simply be an adder to the digital input for the cinema In some cases, such a slide may be visible because the watermark is not moving or changing. To redress this, the system could use an LCD array or light valve that changes over time. Some property of the watermark would change from frame to frame, perhaps the origin of the grid, perhaps the payload, and thus make the watermark appear as time dependent noise rather than fixed pattern noise.

The watermark can be relatively weak since the ID only need to be detected somewhere in the movie, and watermark signal from multiple frames can be used to aid the detection. Reliable detection once every, e.g., 5 or fifteen minutes, can employ thousands of frames of data (e.g., at 25 frames per second).

On the production and distribution side, of course, a watermark can be applied at any stage of the process—the camera that first captures raw footage, the non-linear editing machine that produces the final editor's cut, the mastering machine that produces distributed content, the transmission system that distributes the final content to the theatres, etc.

In addition to watermarks encoded at time of production and distribution, a further watermark may be added at the theatre, e.g., including time and date of screening.

In cinemas using micro mirror projection devices, the mirrors provide a vehicle to insert subtle changes representing watermark data. For example, each mirror element's reflectivity property can be tailored to as to uniquely serialize each projector.

Of course, the foregoing can also be realized using audio watermarks instead of, or in addition to, video watermarks. In bootlegs made from the projection booth, the sound to the front speakers is usually tapped. If desired, the rear speakers can be provided the same watermark data in opposite phase, causing the watermark to cancel in the auditorium. This may permit a higher energy encoding of the audio watermark than would otherwise be the case.

Finally, cinema screens have holes for sound penetration. By re-arranging the size and/or position of holes, an essentially imperceptible watermark pattern can be formed that serves to identify the particular screen (and cinema).

Watermarks and Digital Object Generation Tools

Document generation tools continue to increase in sophistication and complexity. Adobe offers a variety of such tools, including their InDesign software. Watermarking can advantageously be effected in such systems.

In such environments, a document may be created using a variety of tools—most of which can insert a watermark. One program may use as input the output of one or more other programs (i.e., "compositing").

To better handle watermarking in this environment, a watermarking function (e.g., a PostScript-like command) can be provided in the tools. This function is called with parameters specifying the desired features of the watermark information, e.g., payload, robustness level, masks to be used. At rendering time, such as for on-screen viewing, printing proofs, or ripping the final version, the watermark is actually added as digital data. In such environment, the embedder knows the properties of the rendering device, such as the printer, and appropriately adjust its embedding accordingly. With this concept, watermarks are not lost during composite operations, and watermarks can be embedded in vector (or line) art. Moreover, the color manager at the ripping stage may be the best entity to add the watermark.

This idea likewise extends to video—especially MPEG-4 object video, audio—especially MIDI or MPEG-4 structured audio language, and virtual advertisements.

The use of a PostScript-like function to embed a watermark is further detailed in U.S. Pat. No. 6,522,770.

An alternate method is that no desktop tool has watermarking capability, but instead an on-line watermarking server is available to support common image formats. A variety of tools are enabled to submit images to the server with information regarding the desired parameters of the watermark. The server then returns the image to the application. In this way, the burden of integration is virtually eliminated and the registration and marking take place simultaneously.

The watermarks in content, such as an image, can be used by web page designing software to automatically cause actions to happen, such as automatically add the correct hyperlink for that image into the web page being designed, controlling secure transfer (encryption) of the image in web page. For example, the web authoring tool screens for watermark in images, goes to a central or distributed database and obtains the current link for that image and metadata about that image. The web design tool can place that metadata into a standard form with the image on the web page. In another example, a user drags the image of a house onto web page and web authoring tool screens the watermark, uses it to link to the database, the database returns the pertinent hyperlink to be placed on the web page when that image is clicked and other metadata which is automatically formatted and added to the web page. When watermarked content is dynamically added to web pages at render time, possibly via the use of scripts that determines the correct image or ad to place in the web page at rendering time, the watermark is used to determine the correct hyperlink for the image. Specifically, the web server or dynamic administrator that adds the content screens the watermark and inserts the correct link into the HTML document.

The system can use data embedded in the header, footer or frame of the content, such as a link and description in the header. In this case, the link in the header of the content is added to the HTML of the web page by the web authoring tool. The system can use a watermark, where the watermark is minimally perceptible and includes around 32-bits of data, and a secondary database lookup to find the desired link and information to automatically be added to the web page during authoring. Finally, the system can use a watermark that contains the information to be added to the web page. For example, the watermark may contain the lyrics of a song, which are added to the HTML web page automatically by the authoring tool when the song is added to the web page. This watermark requires around 30 bits per seconds, which is currently obtainable with non-robust watermarks and will be obtainable with robust watermarks in the future.

The watermark could help the web authoring tool link to a digital asset management (DAM) database, which could provide more information about the content. With the correct template and DAM system, dragging an image into a web authoring tool could cause the whole page to be instantly created.

Blank Paper Arrangements

In various of the assignee's prior patent filings, the notion of tinting blank paper substrate with a watermark was disclosed (e.g., U.S. Pat. No. 6,345,104 and application Ser. No. 09/631,409). Many printers, however, cannot print to the margin of paper due to interference by pinch-rollers, or other paper-handling mechanisms. If a paper is tinted with a watermark, but the watermark does not extend to the edge of the page, the invisibility of the watermark is compromised by the contrast with the bordering, unmarked part of the page.

One approach is simply to exploit this visual feature—publicizing that it signifies that the page is watermarked.

A curative approach is to taper-off the watermark intensity towards the edges of the page, so a smooth transition between marked and unmarked regions may be effected. This will compromise readability near the edge of the page, but that is an acceptable trade-off in most applications.

Another approach is to pre-mark the blank paper at the margins, e.g., by the paper producer. The margin can be printed with a watermark that conveys just the reference (orientation/grid) signal.

Yet another approach is to pre-mark the entire page, e.g., by the paper manufacturer or distributor (e.g., Xerox or HP). All pages in a package (e.g., of 100 sheets) may be marked identically. An informational page can be automatically generated for that package by a variable data printer. In addition to including the unique code associated with that pack, the informational page also tells the consumer how to register the URL for those unique watermarks, e.g., by visiting www.mymarc.com. This page is inserted into each pack, and the package is distributed through the normal retail channels. (In-store kiosks may be used to facilitate user registration of purchased paper packs.) When the user purchases the pack, he or she visits the mymarc.com site and specifies the URL to which that uniquely-marked paper should link.

More on Physical Objects

In application Ser. Nos. 09/670,114 and 09/151,492, the present assignee detailed how watermarks can be employed on everyday objects, such as wristwatches, and serve to enable additional features.

The detailed embodiments noted that a watermark pattern can be engraved into an exterior surface of such an item. But other arrangements are possible. Consider digital watches, or other devices with electronic displays. A watermark pattern can be formed by the display itself, by controlling individual pixels accordingly. Different patterns can be made to appear on the screen in order to provide different functionality.

Taking the case of a digital wristwatch, it is familiar that many different features and modes can be set by manipulation of a few simply user interface controls—such as buttons. In accordance with this aspect of the invention, one mode can set the watch to display a first watermark pattern. The user can present the wristwatch display to a webcam, which senses the displayed pattern, decodes the watermark therefrom, and triggers a corresponding action. The action corresponding to the first watermark pattern can be to link an associated internet device to a personalized web site relating to the user's fitness training (e.g., as further detailed in the '114 application).

Similarly, by further manipulation of the device's user interface, a second watermark pattern can be made to appear on the watch display. When this pattern is sensed by a webcam, a different response can be triggered (e.g., access to a web-based email account associated with the user).

While the responses just-detailed are tailored to the particular user, other patterns can trigger responses that are the same for a class of users, or for all users. Examples include linking to CNN headlines, weather information, etc.

To trigger custom responses, custom watermark payloads—unique to that user—can be employed. This can be achieved by device serialization, e.g., assigning each wristwatch a different ID number, and deriving unique watermark payloads from such ID. (Suitable measures must be taken to assure that user privacy is respected.)

Another way of triggering user-customized responses does not rely on serialization of the wristwatch. Instead, the responding- or linking-system (e.g., a PC, camera-equipped cell phone, etc.) can include data specific to the user. Thus, all wristwatches may display the same watermark pattern when put in the "link-to-personal-training-website" mode. John's computer can respond to this payload by linking to www.address.com/john_fitness, whereas Jane's computer can respond to this same payload by linking to www.address.com/jane_fitness.html—based on customization data resident in the associated device.

One advantage to such an arrangement is that the wristwatch housing does not need to be custom fabricated. Another is that the watermark can be controlled to present a number of different payloads, rather than a single, unchanging, payload.

Authenticating Credit Cards, Etc.

In U.S. Pat. No. 7,191,156, the assignee disclosed how a consumer's physical custody of a credit card can be verified—when making on-line purchases—by showing the credit card to a camera-equipped system that reads a verification watermark from the card face.

To deter use of precision photocopy apparatuses to reproduce credit card faces (with associated watermark), the face of the card can be provided a reflective layer, e.g., in the form of an overlay or varnish. In the bright illumination of a photocopier, such layer mirrors the light back onto the photodetectors, preventing them from accurately reproducing the watermark pattern. In contrast, when presented to a web cam or other such imaging device, no bright illumination is typically present, so the photosensors are not overwhelmed and the card can be used for its intended authentication purpose.

If a home PC web cam, or other imaging device, is used to capture an image of the card—to confirm its physical presentment—the same imaging device can be used to acquire an image of the user (only with user permission . . . ) This image can be transmitted to the on-line merchant and stored in association with the transaction record. Automated pattern recognition techniques can be used to confirm that the image captured and logged in the merchant's computer is, in fact, a face. If it later turns out that the card was stolen, on-line merchants with which it was used may have an image of the perpetrator.

It may be desirable to incent authenticated on-line credit card transactions by providing a reward to consumers who participate in the desired manner. Thus, for example, a consumer that demonstrates physical custody of a credit card by presenting same to a camera (and having the watermark decoded, etc.), may receive a 0.5% discount. If the consumer further consents to capture and storage of a facial image, the consumer may receive a 1% discount, etc.

Alternatively, the incentive may be offered to the merchant, by the charge card company.

In a variant arrangement, the watermark reader can read the watermark and also capture image data unique to the card/camera combination. The data is submitted to an authentication server and thus becomes a "signature" for that transaction. Any form of attack that attempts to replay the transaction at a later time will fail because of duplicate signature. Because the actual card image is not used, it cannot be captured as a form of attack. Furthermore, a scanned image of a card used to circumvent the system would have an unvaried signature and would thus trigger detection of the attack if used multiple times.

Arrangements to Confirm Physical Custody

A premise of the '049 application—remotely confirming possession of an object by use of watermark information decoded from the object—finds application beyond internet credit card usage.

One such other application is in software licensing. If a corporate enterprise buys a license entitling it to install a software program on 100 computers, it typically receives a single copy of the disk, and then installs the software on (hopefully) 100 computers or less.

The disk can be distributed with a watermarked card, or other talisman. (Or the disk itself can be watermarked.) Each time the software is installed on a computer, the card (or talisman, or disk) must be shown to an associated web cam. The computer decodes the watermark, transmits it to the software vendor, which then increments a tally detailing the number of installations made so far. If the number doesn't exceed the licensed number, the software vendor transmits-back a key or other data that permits the program to be utilized.

If the card is not shown to the camera, or if the card is shown 101 times, the software is inoperative.

Magnetic Recording Media

Magnetic recording media are well suited to steganography, such as digital watermarking.

While prior art teaches that minute variations (e.g., noise) inherent in a magnetic medium (e.g., a credit card stripe) can be used to uniquely identify the medium, it does not appear such slight variations have been effected deliberately to convey auxiliary, (convert) data.

The same functionality gained by watermarking of digital and physical objects (e.g., object identification, authentication, linking, etc.) can likewise be achieved by watermarking of magnetic media.

Other Arrangements

The applications of watermarking extend far beyond those noted above. One is steganographic marking of circuit boards, e.g., to encode manufacturing information (fab date, mask identifiers, process parameters) and security or authentication information. Another is marking of public signage, e.g., street signs, with steganographic marking that can be sensed by automotive sensors and used, e.g., for navigation purposes.

While watermarking of physical objects is known from the assignee's prior applications, the objects can be those associated with rendering of electronic content. Thus, for example, computer screens (CRT and LCD) and projection system optical components can be formed to encode a static watermark on all content rendered on such device.

Counterfeiting of designer garments is big business. Such piracy can be deterred by watermarks. For example, a garment's hang-tag or ribbon-tag can be watermarked (e.g., by tinting, text steganography, etc.), and cross-checked against data memorialized elsewhere on the garment (e.g., a barcode on another tag, or a watermark formed by subtle changes to coloration or imagery on the garment). If these two data do not correspond in an expected manner, the garment may be presumed to be a knock-off.

In some applications, a watermark can be initially concealed, and revealed after usage. The soles of shoes, the tread of tires, any other media that wears-away can cover a watermark pattern, and reveal same only after a period of usage.

Intereliant Watermarks

One watermark (or non-watermark meta data) can convey information about a second watermark in the same object. For example, the first watermark can identify a particular algorithm used to encode the second watermark. By decoding the first watermark, information useful in decoding the second watermark is obtained. The first watermark can have a low information content, and thus be relatively inconspicuous. The second can have a much higher information content (e.g., a unique ID identifying the content). By knowing particular information about the second watermark (e.g., the particular encoding algorithm), it can more reliably be decoded without increasing its energy (and visibility).

Content-Responsive Devices

U.S. Pat. No. 7,261,612 discloses use of watermark technology in connection with toys and dolls that provide "read-aloud" book functionality.

More generally, any mechanical device with a processor and some form of stored memory capable of holding a software program (that can make the machine behave in different manners) can respond to watermarks. The machine discussed can vary greatly in form factor, but—in addition to toys and dolls—can include industrial robots, home appliances, consumer electronic devices (e.g., VCR), etc.

In many cases, the ability of a human owner to actually access and trigger programming within the machine is limited by the form factor, the complexity of the interface or the capabilities of the owner/operator. In the first instance, consider a toy robot or doll with no traditional human input interface such as button controls, keyboard or mice. In the second instance, consider a device such as a VCR which has programming controls, but where the actual steps for programming are time consuming or cumbersome for the owner (thus the permanently flashing 12:00:00 on the front display). In the third instance, the owner of a device such as a toy may not be able to execute complex instructions or even read the instructions due to age limitations, etc.

In accordance with this aspect of the invention, such a machine is provided with a booklet of instructions, each page of which is watermarked to serve as a programming "trigger." One page, for example, may have the trigger for setting a robot to dance. By flipping to the page, then holding the page up in front of the robot, the trigger is delivered via an onboard camera and reader. The robot then uses the watermark/trigger to retrieve the instruction set associated with the watermark and alters behavior accordingly. In the case of children's toys, the instructions could be in the form of pictographs. In this case, the child only needs to be instructed in how to select the desired action, then hold the booklet up to trigger the behavior.

Infrastructure

In U.S. Pat. No. 6,947,571, the present assignee disclosed methods for handling watermark-based requests from client applications based, e.g., on the watermark's "type" and "number."

In an enhanced system, the client application can specify a router/product handler, allowing the Back Office facility to better load balance versus the associated watermark registry database. The client application can do this by appending a router name/number to the basic URL it now uses to communicate with the Back Office. Each of these "type-specific" Back Office router/product handlers can be responsible for servicing a specific, smaller portion of the entire registry database, speeding up their performance and keeping the consumer's perceived response time short.

This change can be in addition to the "geographic routing" feature detailed below.

More Infrastructure

To speed response time in watermark-based applications (such as the Digimarc MediaBridge application detailed in U.S. Pat. No. 6,947,571, it is desirable that the responding system be located close—in network terms—to the client application or device.

It has been the intent from the outset to have more than one Digimarc MediaBridge Grand Central router, and to field them at various locations throughout the US and internationally.

Based on the location of the user (using the country code or postal code they have stored on their computer or have given to Digimarc during the software registration process), we communicate with a specific Digimarc MediaBridge Grand Central router located closest to them geographically (or network-geographically).

When a user connects between their PC and a website hosted on a computer somewhere else in the world, the connection is not normally a single connection between just those two computers. The Internet isn't built that way. The Internet takes the user's request (specified via the Uniform Resource Locator—URL) and routes the user through whatever intermediary computers, routers and switches that seem appropriate at the time of the user's request. This mechanism is similar in many ways to making a long-distance phone call. Each of the connections through an intermediary is called a 'hop'. Typically, the further away the URL is geographically located on the world-wide web, the more 'hops' it takes to make the connection. The more 'hops' the more latency is introduced as each intermediary point and the slower the actual response and the less reliable the connection.

All communication between the Digimarc MediaBridge reader/detector application and the Digimarc MediaBridge Grand Central router is accomplished by sending messages back and forth over the Internet. One of the ways that Digimarc improves the reliability of its service and can slightly increase its speed is to minimize the 'hops' in the user's connection with the to locate the Digimarc MediaBridge Grand Central router. The simplest way to do this is to find the Digimarc MediaBridge Grand Central router geographically closest to the user.

The mechanism works like this:

The reader/detector queries a "master" router when the reader/detector application is first invoked, sending along the country or postal code from the user's computer The "master" router matches the country or postal code to the appropriate Digimarc MediaBridge Grand Central router—the one closest to the user and sends that reply back to the reader/detector application The reader/detector application now uses this supplied closest Digimarc MediaBridge Grand Central router for all future communications required to perform its ID to action association functions A simple 'hop' map currently might look like this—
originating user in Glenmoore, Pa. 19343. Digimarc MediaBridge Grand Central router located in Tulsa, Okla.
Glenmoore to Paoli, Pa. (ISP dial in connection point)
to Philadelphia, Pa. (Internet "hub")
to Dallas, Tex. (Internet "hub")
to Tulsa, Okla. (Internet "hub")
to Digimarc Offices in Tulsa, Okla.

With a second Digimarc MediaBridge Grand Central router located in Philadelphia, the 'hop' map looks like—
Glenmoore to Paoli, Pa. (ISP dial in connection point)
to Philadelphia, Pa. (Internet "hub")
to Philadelphia Digimarc MediaBridge Grand Central router If the second Digimarc MediaBridge Grand Central router is located in New York, N.Y., the 'hop' map looks like—
Glenmoore to Paoli, Pa. (ISP dial in connection point)
to Philadelphia, Pa. (Internet "hub")
to NY, N.Y. (Internet "hub")
to NY Digimarc MediaBridge Grand Central router Text Watermarking For text watermark, the watermark could add spaces at end of text. The spaces at the end of the line or characters in each line can be used to represent 1's and 0's. For example a line with an even number of characters is a 1 and odd number of characters is 0. In addition, only certain lines could be used, such as lines with specific text. For example, in watermarking news stories, only the lines with the text "AP wire" is watermarked. The watermark can identify the story or distributor, for forensic tracking.

In addition, the data to be embedded can be modified by a function related to the original text, such as a hash of the text. This way it is difficult to duplicate the watermark.

To provide a comprehensive disclosure without unduly lengthening this specification, the patents and applications cited above are incorporated herein by references.

Having described and illustrated the subject technologies with reference to illustrative embodiments, it should be recognized that the invention is not so limited.

For example, while the detailed description focused on digital watermarks to convey auxiliary information with audio and video content, other techniques can be used as well (e.g., VBI, digital fingerprints, header meta data, etc.). Likewise, in embodiments relating to marking of physical objects, other machine-readable data representations can be employed (e.g., bar codes, glyphs, RF IDs, mag stripes, smart card technology, etc.).

The implementation of the functionality described above (including watermark decoding) is straightforward to artisans in the field, and thus not further belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

It should be recognized that the particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

APPENDIX A

Specification of U.S. Pat. No. 6,505,160, with Re-Numbered Figs.

Connected Audio and Other Media Objects

Technical Field

The invention relates to linking audio and other multimedia data objects with metadata and actions via a communication network, e.g., computer, broadcast, wireless, etc.

Background and Summary

Advances in computer and wireless networking, multimedia coding, and higher bandwidth communication links are creating many new ways to distribute and enjoy multimedia content, such as music and movies. Coding formats for audio like MPEG 1 Layer 3 (MP3) have already caused significant changes in music delivery to consumers. Despite the advances in technology, content distributors and broadcasters still need to address how to effectively promote and sell content.

This disclosure describes systems and processes for linking audio and other multimedia data objects with metadata and actions via a communication network, e.g., computer, broadcast, wireless, etc. Media objects are transformed into active, connected objects via identifiers embedded into them or their containers. These identifiers can be embedded by the owner or distributor of the media object, or automatically created from the media object. In the context of a user's playback experience, a decoding process extracts the identifier from a media object and possibly additional context information and forwards it to a server. The server, in turn, maps the identifier to an action, such as returning metadata, re-directing the request to one or more other servers, requesting information from another server to identify the media object, etc. If the identifier has no defined action, the server can respond with an option for the user to buy the link and control the resulting action for all objects with the current identifier. The linking process applies to broadcast objects as well as objects transmitted over networks in streaming and compressed file formats.

Further features will become apparent with reference to the following detailed description and accompanying drawings.

Detailed Description

Linking Audio and Other Media Objects Via Identifiers

The following sections describe systems and processes for linking audio and other media objects to metadata and actions via an identifier. For the sake of illustration, the disclosure focuses on a specific media type, namely audio signals (e.g., music, sound tracks of audio visual works, voice recordings, etc.). However, these systems, their components and processes apply to other types of media signals as well, including video, still images, graphical models, etc. As described further below, an identifier attached to an audio signal is used to connect that signal with metadata and/or programmatic or device actions. In the context of this document, the terms "media object" and "audio object" refer to an electronic form of a media signal and audio signal, respectively. The linking of media signals applies to objects that are transmitted over wire networks (such as a computer network), wireless networks (such as a wireless telephone network), and broadcast (AM, FM, digital broadcast, etc.).

There are a number of ways to associate an identifier with an audio object. One way to associate the identifier is to insert it in the form of a numeric or alphanumeric code (e.g., binary or M-ary code) in the electronic file in which the audio is stored. Another way to associate the identifier is to embed it as auxiliary data in the audio signal using steganographic methods, such as digital watermarking or other data hiding techniques. Yet another way is to derive the identifier from the audio signal, the table of contents, the file system structure, or its container (e.g., an electronic file or physical package for data like flash memory, Digital Versatile Disk (DVD), minidisk, or compact disk (CD). The physical media may have identifying characteristics, such as a unique identifier or encoded metadata, or other attributes from which an identifier can be derived (e.g., CD disk wobble).

When the identifier is associated with metadata or actions, it transforms the media object into a "linked" object. The identifier travels with the object through distribution, including in some cases, through physical distribution in packaged media and through electronic distribution (broadcast or network communication). The identifier may travel within the same band as the audio object, such as a watermark, or via a separate band, such as a file header or footer or separate broadcast band. A decoding device or programmatic process extracts the identifier from the object and uses it to retrieve related data or actions ("metadata"). In the case of an audio object, like a song, the metadata typically includes the title, artist, lyrics, copyright owner, sound recording owner, information about buying or sampling opportunities and URLs to this type of data as well as web sites and other programs and devices. Linked actions include device or programmatic processes for electronically establishing a license, transferring content (either streaming or download), sending an email, recording marketing data about a transaction, etc. The identifier allows a fan of a particular type of music or artist to get more information about the music and to buy more music. From the perspective of the artists and record labels, the identifier provides an additional opportunity to promote their music and sell content, concert tickets, etc.

In addition, in some implementations where identifier linking transactions are monitored, it enables the vendors of music to gather data about electronic transactions triggered by the link. For example, users of information may choose to provide information about themselves when they register their decoding device or software with the system. A user ID or other context information may then be recorded when the identifier is extracted and used to trigger a transaction. Many entities involved in the distribution of media signals can benefit from the linking capability. Artists can link their music to information about themselves and provide electronic buying opportunities for music, concert tickets, clothing, etc. Rights holding organizations can use the link to inform users about itself and licensing opportunities. In some cases, the link may also be used to monitor playing and distribution of copies of the music. Record labels can link their music to information about the artist, the label, electronic buying opportunities, etc. Electronic retailers can increase sales by linking users to opportunities to sample and buy additional music (via download or streaming delivery over a wire or wireless network). Conventional brick and mortar retailers can use linking to provide information about the music and to provide buying opportunities. Radio stations and other broadcasters can use the linking capability to bring users to their web sites, creating advertising revenue, to provide electronic buying opportunities for music, concert tickets, clothing items, etc. These and other forms of linked metadata and actions may be implemented in various combinations in different application scenarios.

Depending on the application, the identifier may identify the media object in which it is embedded, or entities, things or actions other than that particular media object. One type of identifier is an object ID that identifies an audio object. This identifier may be a number associated with the object, such as its International Standard Recording Code (ISRC). Another type of identifier is distributor ID that identifies the distributor of the audio object. Another type of identifier is a broadcaster ID that identifiers the broadcaster of the audio object. Of course, more than one identifier may be encoded into an audio object or its container. In the event that an object ID is not encoded with an audio object, but instead, a distributor or broadcaster identifier is encoded with the object, other context information, such as the time of play back or distribution, location of distribution, etc. may be used to identify the audio object as part of the linking process. An example is a radio station that marks its broadcasts with a station ID and maintains a playlist database with the air times of each audio object. At decoding time, the station ID is extracted and used along with context information such as the air time of the audio object to look up the audio object or its corresponding metadata and actions. This approach enables the linking system to provide audio object specific metadata or actions even without requiring a unique object identifier in every audio object.

System Implementation

Figure 4:
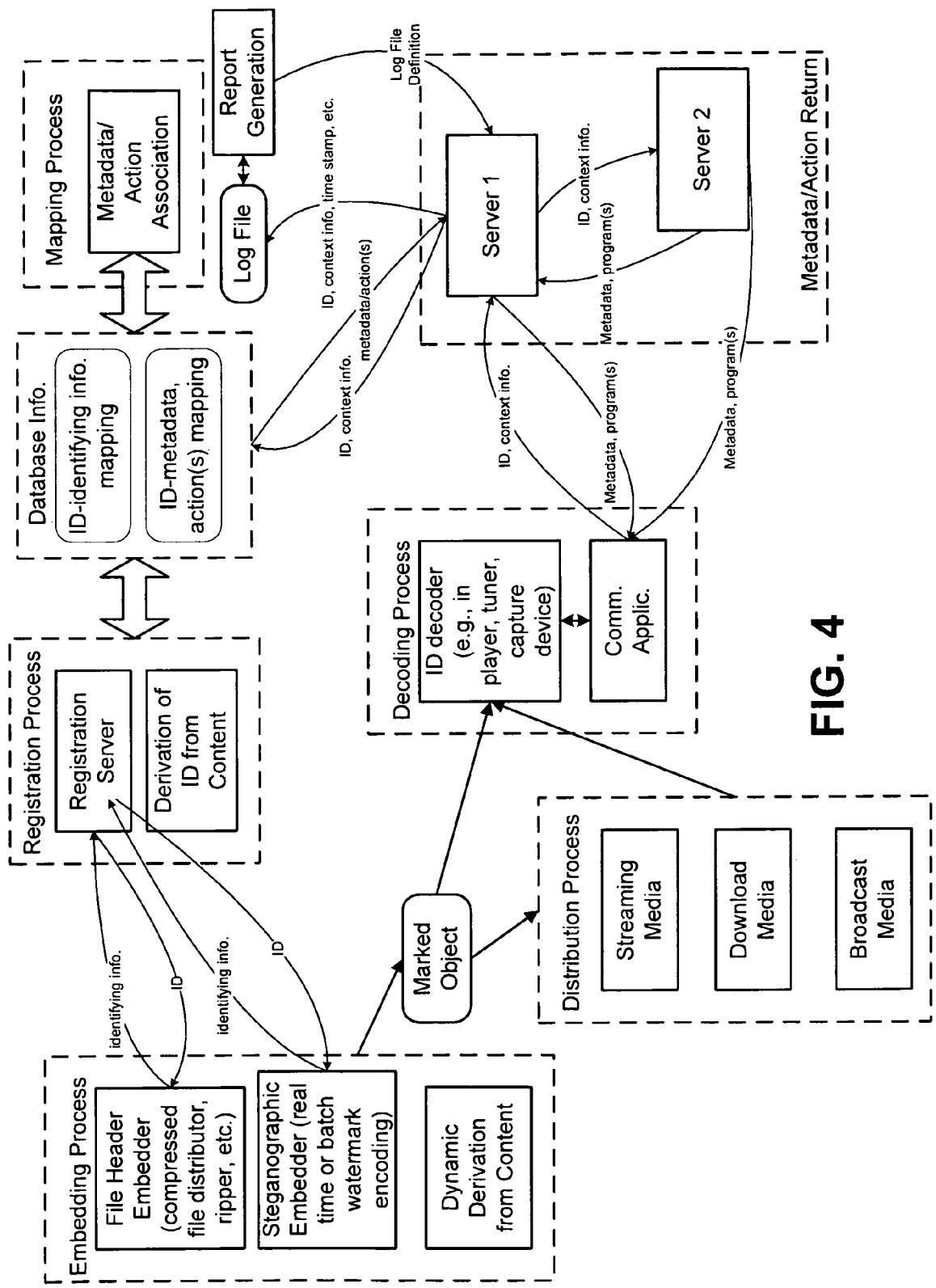
FIG. 4 is a diagram illustrating examples of media object linking processes and systems in accordance with an illustrative embodiment.

FIG. 4 is a diagram of a system configuration of linked media objects. In this configuration, an identifier links audio objects to metadata via an electronic network, such as the Internet, a wireless network, or a broadcast network. As depicted in FIG. 4, an embedding process may be used to encode an identifier in an audio object or its container. In some cases, an embedding process encodes the identifier in the audio file (e.g., a tag in a file header or footer), in the audio signal (a digital watermark), or in the physical packaging. The identifier may also be derived as a function of the audio signal or other information in the file or physical packaging (e.g., track information on a CD). In the case of dynamically derived identifiers, an embedding process is not necessary because the identifier can be derived from the content at decoding time.

In some application scenarios, the embedding process interacts with a registration process to get an identifier. The embedding process provides information about the object (e.g., a title and artist name, an ISRC, name of distributor, etc.). In response, the registration process provides an identifier and stores a database record of the association between identifier and the object or other information used in decoding to identify the object, such as its distributor or broadcaster. The registration process may be used to assign an identifier to an audio object and to distributors or broadcasters of audio objects. The embedding and registration processes may occur before the audio object is distributed to consumers, or sometime thereafter, such as when a user transfers (e.g., "rips") an a media object from one format to another (e.g., a packaged format to an electronic file format such as a compressed file format).

Once registered, an interactive or automated mapping process associates the identifier with data or actions. The registration process creates a database of identifiers and associates the identifiers with corresponding media objects, distributors, broadcasters, etc. The mapping process associates the identifiers with corresponding metadata or actions.

Once associated with an audio object and metadata, the identifier transforms the audio object into a linked object. The identifier remains with the object through distribution, although some embedding processes are more robust than others to intentional or unintentional distortion/removal of the identifier. There a variety of different distribution scenarios. Some examples depicted in FIG. 4 include transferring an audio object over a computer network, streaming the object over a computer network, or broadcasting it (e.g., AM/FM broadcasting, digital broadcasting, broadcasting over wireless carriers, etc.). Whatever the distribution process, a user ultimately receives the linked object in a player, tuner, or capture device.

To activate the linked object, a decoding process extracts the identifier and uses it to access associated data or actions. The decoding process may be implemented as a separate program or device, or integrated into a player, tuner, or some other capture device, such as a listening devices that converts ambient audio waves to an electronic signal and then extracts the identifier from the signal.

In the configuration shown in FIG. 4, the decoding process forwards the extracted identifier to a communication application, which in turn, forwards it in a message to a server. The decoding process or the communication application may add additional context information to the message sent to the to a server. The context information may relate to the user, the user's device, the attributes of the session (time of playback, format of playback, type of distribution (e.g., broadcast or transmitted audio file), etc.) Based on identifier and optional context information, the server determines an associated action to perform, such as re-directing an identifier or context data to another server, returning metadata (including programs, content, etc.), downloading content, logging a transaction record. To find the associated action or actions, the server maps the identifier to actions based on the information established in the mapping process. The server may: 1) look up the data and actions in a local database stored in its memory subsystem; 2) route the identifier to one or more other servers via the network, which in turn look up related actions and data associated with the identifier; or 3) perform some combination of actions 1 and 2.

In the first case, server 1 returns data or actions associated with the identifier. The server may look up related data based on the identifier alone, or based on the identifier and other context information. Context information may be information provided by the user, by the user's computer or device, or by some other process or device. In the second case, the server looks up one or more addresses associated with the identifier and forwards the identifier and/or possibly other context data to secondary servers at these addresses via conventional networking protocols. Again, this context data may include data from the user, the user's computer, some other device or database. For example, server 1 might query a remote database for instructions about how to process an identifier. These instruction may specify data to return to the communication application or to forward to another server, which in turn, looks up associated data and returns it to the communication application. A server may return data that an audio player displays to the user or uses to control rendering of the content. For example, the server can tell the player that the object contains inappropriate content for children. The player or user can make decisions about whether or how to play the material based on this information.

Both the server and the player can adopt a set of rules. The server rules may be used to control what the server returns in response to an identifier and context data. The player rules may be used to control what the player displays to the user or how it renders the content based on data returned from a server.

Either the first server, or a server one or more levels of indirection from the identifier may return data and programmatic actions to a player via the communication application. Each server in these levels of indirection receives a database key, such as an identifier or context information, from the previous server, and uses it to look up corresponding actions. These actions may include returning data or programs to the communication application or to previous servers in the routing path of the message from the communication application. Also, the servers may route requests for information or actions to other servers. The server or servers may return data or perform actions in response to the identifier (or other context data) that do not directly impact the decoding process, or the device in which it operates.

The system depicted in FIG. 4 allows several different interested parties to establish services linked via the identifier. For example, server 1 can be configured to provide generic promotional and/or licensing information associated with an identifier. If the content owner, distributor, retailer, artist or other related party wishes to provide information or services for a connected object, then server 1 may also route the identifier for that object, and possibly context information, the address of the communication application, and instructions, to servers maintained by these entities. These servers, in turn, provide promotional, sales, or licensing information, and electronic buying or licensing opportunities specific to that entity back to the consumer over the network via the communication application.

In the context of a network configuration, Internet protocols may be used to return data to the communication application or to the device or system in which it operates. The communication application may be implemented in a web browser, such as Internet Explorer or Netscape Navigator. Examples of ways of exchanging information between a client player and a server include returning a web page with metadata and program scripts designed to run on the end user's system. The metadata itself may include active links, such as URLs to other network resources, such as a web site or some other network service. The path of the identifier from the decoding process, and the return path from a server to the communication application may include one or more hops through a wire or wireless connection using standard wire and wireless communication protocols like TCP/IP, HTTP, XML, WAP, Bluetooth, etc. In addition, data returned to the user may be routed through one or more servers that may forward the data, and in some cases, augment the data or modify it in some fashion.

Figure 5:
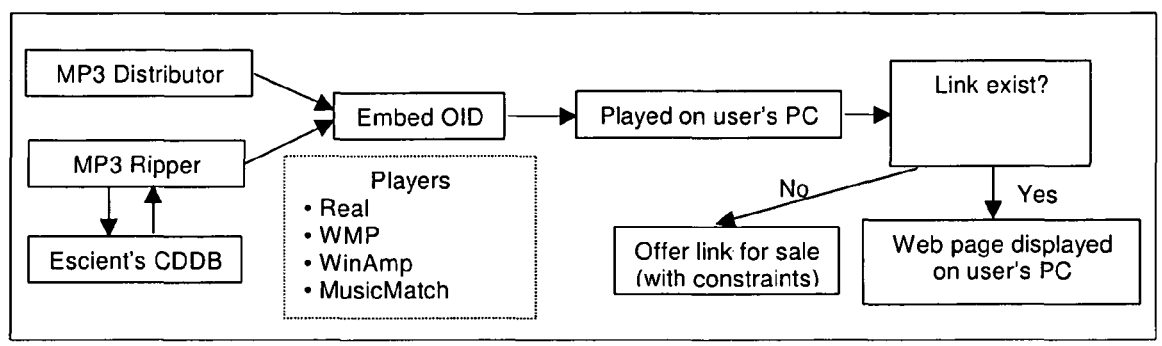
FIG. 5 is a diagram illustrating media object linking applications in accordance with an illustrative embodiment.

FIG. 5 is a diagram illustrating applications of the system depicted in FIG. 4. In the application scenarios depicted in FIG. 5, an embedding process encodes an object identifier (OID) into an audio file, such as an ID3 tag in the header of an MP3 file or audio frame headers in the MP3 file. FIG. 5 shows two embedding scenarios. The first is an MP3 distributor that embeds OIDs in MP3 files before transmitting them over a network, such as the Internet, typically via a web site interface. The second is a file ripping process where a programmed computer or other device extracts an audio object from packaged media such as a CD and converts it into a coded file format like MP3. In the latter case, the ripping process may extract metadata from the CD, such as the table of contents, and use this metadata as a key to a database (CDDB) to get information about the songs on the CD, such as title, artists, etc. The table of contents or other metadata from a package medium, such as optical or magnetic storage or flash memory, may be hashed into an index to a database entry that stores information about the media signal stored on the medium. The ripping process uses the information returned from the database to identify the audio objects on the packaged media so that they can be associated with an OID. This is an example of identifying information used to associate an OID with an audio object. As part of the coding process, the ripping process inserts the OID in the file header of the MP3 file.

Later, when a user opens or plays the marked MP3 in a player, such as a software player like the real player, Liquid Audio player, Windows Media Player (WMP), WinAmp, MusicMatch, etc., a plug-in software module in the player extracts the OID and forwards it to a server via an Internet connection. The plug-in may establish its own Internet connection, or pass the OID to an Internet Browser, which in turn, establishes a connection (if one is not already present) with the server. As an intermediate step, the plug-in may display a window with user options, such as "learn more about the song", "play the song", or both. The user can then choose to get more information by actuating the first or third options in the user interface window, which cause the plug-in to forward the OID to the server.

The server then returns a web page associated with the OID, or re-directs the OID to another server (e.g., one maintained by the content distributor or owner), which in turn, returns a web page of information about the object and links to related actions (e.g., a link to a licensing server, a link to a server for buying and downloading related music etc.). The licensing server may be programmed to download software players and new music offerings compatible with those players. For instance, the licensing server may provide software for decrypting, decoding, and playing electronically distributed music according to usage rules packaged with the electronically distributed music. In this application scenario, the linking of the MP3 file enables the content owner to market music and products that promote the sale of audio objects in other formats, included formats protected with encryption, watermark copy managements schemes, etc.

In the event that a media object is not linked, the decoding and server processes can be programmed to enable the user to purchase a link for the object. For example in one scenario, the player plug-in displays a graphic for a link information indicating that the link is available after determining that an OID is not in the file. If the user clicks on the graphic, the plug-in displays more information about the procedure for purchasing or renting a link. This information may be provided in conjunction with querying the server and displaying information returned from the server, or alternatively, providing preprogrammed information incorporated into the plug-in. If the user is interested in purchasing the link, he or she can then enter input (e.g., click on a button such as "Get Link") that initiates the process of registering an OID with the object and associating metadata or actions with the OID. The process of registering the OID and associating the OID with metadata or actions may be performed as described in this document. This scenario provides yet another mechanism for transforming content into connected content.

There are many possible variations to the applications scenarios illustrated in FIG. 5. During the file ripping process (or some other embedding process), the embedder may generate a unique ID from the metadata read from the packaged media on which the media object resides. One example of such an ID is the number derived from CD metadata currently used to index information in the CDDB database. This ID may then be embedded in the audio object or its file header/footer. During OID registration, the registration process may inform the embedding process that the OID (and thus, the object for which it was derived) has not been associated with metadata or actions. In this case, the user may be given an opportunity to purchase the link, either at the time of ripping, or in the future, wherever the object travels. In the latter case, the OID in the object is associated with an option to buy the link and customize the data and/or actions associated with that link. Rather than link to promotional information, the OID gives users an option to buy or rent the link and provides them with an opportunity to customize it (e.g., linking it to a custom web site). Once customized, other users that open or play the file will then be able to link to the customized information or actions.

To assert control over the type of customization that users may perform, the registration and mapping processes can place constraints on the types of metadata and actions that users can link to a media object.

In the multimedia content industry, there are typically many rights holders and entities involved in the distribution process. This may present a conflict when linking a media object to one entity. One way to address this problem is have an object link to many different entities. For example, the server could map an OID to many entities and return links to retailers, distributors, record labels and artists. Another way to address it is to encode additional information about the distributor in the OID. For example, the OID includes fields that identify the object and its distributor. If a user activates the link to purchase products, including media objects, then the distributor name is logged with the purchase and that distributor is credited with royalties associated with the transaction. The distributor field may also be used as a key to look up the appropriate action for the OID, such as re-directing the OID to the web server of the entity associated with that OID. In this approach, even if the OID directs a user to a record label's website, the distributor field can be used to credit the distributor with a royalty for the linking transaction.

The entity responsible for maintaining a web site linked via on identifier can make deals with online resources for providing data about a media object such as lyrics, song titles, radio station play lists. The website may link to this information, access it via a database manager, etc.

File Identifiers

One form of identifier is an identifier that is inserted in an audio object file, but in a distinct field from the audio signal itself. Some examples are file headers and footers. This file identifier may be assigned before or after distribution of the audio object to consumers. In addition, it may be derived from the audio signal or other information in the file. For example, an identifier generator may derive a unique or sufficiently unique identifier from a portion of a music signal. A variety of methods for generating a unique numbers based on a unique collection of numbers may be used.

The process of embedding a file identifier may be done at the time of encoding or transcoding a file. For example, the file identifier may be inserted during a ripping process, such as when a device or programmatic process converts a song from a format stored on packaged media, like a CD or DVD, to an electronic, and compressed form, such as MP3 or some other audio codec. As another example, the file identifier may be inserted when a device or programmatic process transcodes an electronic music file from one codec format to another. Yet another example is where a file is taken from a digital or analog uncompressed format, and placed in another format for distribution.

Identifiers Embedded in Audio Signal

Another way to associate an identifier with an audio signal is to embed the identifier in the audio signal using steganographic methods, such as digital watermarking or other data hiding techniques. Many of such techniques have been developed and are described in published articles and patents. Watermarking methods are described in U.S. patent application Ser. No. 09/503,881. Other examples of methods for encoding and decoding auxiliary signals into audio signals include U.S. Pat. Nos. 5,862,260, 5,940,135 and 5,945,932. For more information on steganographic applications, see the patent applications incorporated by reference.

The steganographic embedding method may be performed in a batch process. Consider a distributor of electronic music via the Internet or some other network, or a broadcaster of music such as a radio station. In each case, the distributor and broadcaster have a collection of audio objects. The embedding process may operate on this collection of objects in a batch process by retrieving an electronic version, encoding an identifier obtained from the registration process, and returning the marked version for later distribution or broadcasting. In some cases, it is desirable to do watermark embedding in an iterative process in a studio environment to encode the watermark with an intensity that achieves desired perceptibility and robustness requirements.

The steganographic embedding method may also be performed at the time of transmission of an electronic file or broadcast of the audio object. In the case of distribution via a network such as the Internet (e.g., streaming or file download), real time embedding enables the embedding process to also embed context information that is specific to the consumer (or the consumer's computer) that has electronically ordered the object. For example, when the user requests a file in a streaming or a compressed file format via the Internet using her browser, the distributor's server can request information (perhaps voluntary) about the user to be associated with the transmitted object. Later, the decoding process or the servers that map the identifier to actions or metadata can use this information to determine the types of information to provide or responsive action to perform.

In the case of broadcasting, real time embedding enables the identifier to be steganographically embedded throughout an electronic version of the audio signal just before, or as part of the broadcasting process.

An object or distributor ID (as well as other identifiers or context information) can be embedded in the payload of a watermark that is also used for copy control. Portion of the watermark can be used to control whether the object can be played, transferred, recorded, etc., while another part can be used to carry identifiers and other metadata for linking functions described in this document. Alternatively, entirely separate watermark encoding and decoding methods may be used for copy control and linking functions.

A watermarking process may be used to encode different watermarks in the various channels of an audio signal. Message information may be embedded in one or more channels, while synchronization or orientation signals used to detect and decode the message information may be encoded in other channels. Also, different messages (e.g., different identifiers) may be encoded in different channels. At decoding time, the different identifiers can trigger different actions or link to different data.

In broadcasting applications, an identifier may be encoded along with the broadcast of the associated media signal by modulating a subcarrier of the main carrier frequency used to transmit the media signal. The subcarrier conveys auxiliary data such as the identifier, while the main carrier conveys the associated media signal To reduce audibility of the auxiliary data (e.g., the identifier(s)) encoded in the sub-carrier, the data can be randomized by applying it to a pseudo random or random number by some function that may be inverted in the decoding process, e.g., multiplication or exclusive OR functions. One example of sub-carrier encoding and decoding is Active HSDS 97 developed by Seiko Corporation.

Identifiers in Digital Radio Broadcasts

Some forms of digital radio broadcasts support transmission of metadata along with media signals. This metadata can also be used to carry one or more identifiers that are mapped to metadata or actions. The metadata can be encoded at the time of broadcast or prior to broadcasting. Decoding of the identifier may be performed at the digital receiver. In particular, the digital receiver receives the broadcast data, extracts the identifier, and either automatically, or at the user's direction, forwards the identifier to a server to look up the associated metadata or action.

Dynamic Identifier Extraction from Audio Content or Related Data

As noted above, another way to associate an identifier with a corresponding audio signal is to derive the identifier from the signal. This approach has the advantage that the embedding process is unnecessary. Instead, the decoding process can generate the identifier from the audio object. In this case, the decoder computes a fingerprint of the audio signal based on a specified fingerprinting algorithm. The fingerprint is a number derived from a digital audio signal that serves as a statistically unique identifier of that signal, meaning that there is a high probability that the fingerprint was derived from the audio signal in question. One component of fingerprint algorithm is a hash algorithm. The hash algorithm may be applied to a selected portion of a music file (e.g., the first 10 seconds) to create a fingerprint. It may be applied to discrete samples in this portion, or to attributes that are less sensitive to typical audio processing. Examples of less sensitive attributes include most significant bits of audio samples or a low pass filtered version of the portion. Examples of hashing algorithms include MD5, MD2, SHA, SHA1.

As an aside, fingerprinting may also be used to determine whether an audio signal has been watermarked. The fingerprinting application can evaluate a fingerprint for a received object and compare it with one for a watermarked object (or unmarked object) to determine whether the object is likely to be watermarked. Certain fingerprints can be associated with certain types of watermark methods. Using the fingerprint, a decoding device can select an appropriate watermark decoding system for the object.

While specifically discussed in the context of audio objects, the fingerprinting process applies to other types of multimedia content as well, including still images, video, graphics models, etc. For still images and video, the identifier can be derived dynamically from a compressed or uncompressed version of the image or video signal. The fingerprinting process may be tuned to generate a specific identifier based on the type of file format. For example, the process extracts the file format from the file (e.g., from a header or footer), then uses a fingerprinting process tailored for that type of file (e.g., a hash of a compressed image or video frame). The dynamic identifier computed by this process may be associated with metadata and/or actions using the processes and systems described in this document.

Registration Process

One way to implement the registration process is to build client and server application programs that communicate over a computer network using standard network communication protocols. The client may be implemented as a software program that provides identifying information about an audio object. It can obtain the information by prompting the user for the identifying information, or from extracting it from the audio object or its container. The server may be implemented as a database management program that manages identifiers and corresponding audio objects. When queried to provide an identifier for particular identifying information, the program checks whether it has already assigned an identifier to an object based on the identifying information. If so, it returns that identifier that has already been assigned. If not, it assigns a new identifier number, creates a new entry in the database for that number and its associated identifying information.

The type of identifier used to link audio objects varies with the application. As such, the registration process may vary as well. One type of identifier is a unique identifier for an audio object. Another type of identifier is one that identifies some attribute of the audio object, but does not uniquely identify it, such as a distributor or broadcaster identifier. This type of identifier requires additional context information to uniquely identify the audio object at the time of linking it to actions or metadata. For these types of identifiers, the registration process provides information identifying the attribute of the audio object, such as its distributor or broadcaster. In response, the server provides an identifier that may be embedded in several audio objects that share that attribute.

One example is a broadcaster ID, such as a radio station ID. Audio broadcast by, the radio station is embedded with this radio station ID. To identify the object, context information such as the play time captured at the tuner is used along with the radio station ID extracted from the received audio signal to identify the audio object. The decoding process forwards this information to a server. Using the radio station ID and context information, the server maps the ID to an appropriate action. This may include querying a radio station's playlist database for an object identifier based on the station ID and context information. The server can then map the object identifier to an action or metadata based on the object ID returned from the playlist database. Other scenarios are possible. For example, the server could forward the station ID, context data and decoder address to a radio station server, which in turn, looks up the appropriate action or metadata (e.g., web page) and sends it to the device that decoded the station ID.

Broadcast content can also be associated with object identifiers. One way to implement the identifier assignment process is to allocate a unique set of identifiers with each broadcaster/distributor. Those broadcasters or distributors are then free to assign the identifiers to media objects as they wish. Once they complete the identifier assignment process, they may then associate the identifiers with the metadata or actions in a mapping process.

Embedding Process

The embedding process may be integrated into a software program along with the client of the registration process described in the previous section. This integration of registration and embedding functions is particularly suited to a batch embedder, where processing time required to request an identifier is less of a concern.

In real time embedding, the identifier or identifiers are preferably available for associated audio objects before embedding begins. For example, the identifiers can be maintained in a local database on the embedding computer or device and indexed by object title. Distributor and broadcast identifiers are more straightforward because they may be applied to several different audio objects.

The embedding process may also be implemented in an embedding clearinghouse system. The embedding clearinghouse is a computer or other electronic system that analyzes media objects and embeds one or more links in the media objects. The clearinghouse may be implemented in a server on a network, such as the Internet and operate on content in a "push," "pull," or some combination of push and pull models. In the push model, users and other systems send media objects to the embedding clearinghouse for analysis and embedding. The pull model, the clearinghouse has the capability to search for and gather media objects for embedding and analysis. One example of this pull model is an Internet search process called a spider that crawls the Internet, searching for media objects to analyze and embed with one or more identifying links.

The embedding clearinghouse analyzes a media object (perhaps based on out of band data like a file header or footer) and inserts an identifier. This identifier may link to a metadata and actions, such as re-direction to a web site offering products, services, and information related to the content. The embedding clearinghouse may incorporate search engine technology to execute a key word search based on information from the media object and then associate the media object with a series of related URLs returned from the Internet search. The process may be automatic, or with some user input to select which sub-set of links should be inserted.

The embedding clearinghouse may also offer an identifier embedding services for those wanting to link their media objects with metadata, actions, etc. In this application scenario, the embedding clearinghouse may be implemented as an Internet server that is accessible via a web page using conventional network communication and web protocols. To access the server, users visit a web page using an Internet browser. In exchange for a fee, which may be tendered electronically over the Internet from the user's computer to the server, the server provides an embedding service to embed an identifier into a media object uploaded from the user via the user's computer and Internet connection. The user can select the information to associate with a media object, such as generic identifying information (e.g., title, author, owner), generic licensing information, or special information or actions. The generic information is hosted by the provider of the embedding clearinghouse server, while the special purpose information and actions are accessed through re-direction. In particular, the provider of the clearinghouse server links the embedded identifier to an address or set of addresses of servers that provide the special information or actions. Then at decoding time, the decoding process sends the identifier to the provider's server, which in turn, redirects the identifier to a secondary server or servers that provide special purpose information or actions (e.g., redirect to a web page of the content owner, download related content, provide electronic licensing services, etc.).

Decoding the ID and Embedded Context Data

The implementation details of the decoding process depend on how the identifier is encoded into an audio object or its container. In the case where the identifier is encoded in a file header or footer, the decoder may be a software program or digital hardware that parses the header/footer and forwards it to the communication application. One way to implement this type of decoder is to integrate it into a media player as a plug in program. Examples of media players include Windows Media Player from Microsoft, Liquid Audio player from Liquid Audio, Winamp, Real Player from Real Networks. Preferably, the plug-in gives the user visual feedback that the identifier has been detected and displays a window with options to access more information or actions available via the link. For example, the user can be presented with a user interfaces prompting the user to click for more information or buying opportunities. If the user selects these options, the plug-in forwards the user selections and identifier to the communication application, which forwards them to the server (e.g., server 1, FIG. 4).

In the case where the identifier is steganographically encoded in the audio object, a corresponding decoder extracts the identifier. This type of decoder may be implemented as a plug in to a software player as described in the previous paragraph. It may also be implemented in a tuner for broadcast content, or in a listening device that captures audio from the ambient environment.

In the case where the identifier is derived from the content or container metadata, the decoder captures the pertinent portion of the audio object, and generates the identifier as described above. This type of decoder can be implemented in a software or hardware player, a tuner, etc.

The decoder may collect identifiers in response to a user request while objects containing these identifiers are being played. For example, when the user is playing music, he may like a song and want to buy it or get more information. This feature may be implemented by building an interface that has a button or voice recognition that enables the user to request information or a buy/license opportunity. Once captured, identifiers can be forwarded along with user instructions to the appropriate server.

However, one particularly useful feature is to enable the user to fetch information and make orders from music as the music is playing. The system described previously supports this feature because the decoding process can forward the identifier or identifiers, embedded context information, or additional context information (user information, play time, broadcast type, file type, player type, operating system type) to the communication application as the music is playing. The user can trigger the linking action by pressing a "fetch" button, or saying fetch to a voice activated input device that causes the decoding device to package a message and invoke the communication application (e.g., Internet browser). In turn, the communication application forwards the message to a server that parses the message and determines the associated action.

The activation of the "fetch it" feature may be made on a handheld device that communicates with a decoding device in a tuner via a wireless connection. For example, a user may press a button on a remote control device, like a key chain, which sends a wireless signal to a receiver in the tuner. The receiver invokes the decoding process. The tuner may also send metadata from the server to the remote control device for display using a similar wireless connection. Infrared or RF transceivers, for example, may be used to communicate the data back and forth.

The decoding device may also provide continuous decoding of identifiers. When the user requests a "fetch," the identifier and context information for the current song may be forwarded to the server. Also, the decoding device may automatically fetch generic information such as song title and artist so that this information is immediately available to the user.

Another possible implementation is to temporarily buffer identifiers extracted from some predetermined number of the most recent songs, titles, etc. These identifiers can be stored along with other metadata, such as a time stamp, to inform the user when they were captured. The user can then select one or more of the items to send to the server for more information or related actions.

These features may be implemented in one or more devices. While the example above discusses a remote control device and a separate tuner with a decoder, these functions may be integrated into a single device, such as a car stereo, phone handset, personal digital assistant, and a variety of other types of players or tuners.

The identifier enables dynamic linking. Dynamic linking enables the identifier encoded with a media object to remain fixed, while the metadata or actions associated with that identifier can be changed. To change the associated metadata, the mapping process edits the identifier database to associate new metadata or actions with an identifier. The mapping process can be automated to change metadata or actions associated with an identifier at periodic intervals or in response to system events. In addition, a user may change the associated metadata or actions interactively at any time. To facilitate access to the database, a web based interface can be added to the database.

Dynamically linked data returned from a server to a player environment can be displayed to the user in a variety of ways. One way is to display it in a web page or user interface window of a player. The data can be animated by scrolling it across the visual display. The data can also be displayed in the form of HTML links, which, when activated, cause the download of other data or initiate actions, such as playing streaming content from a server.

Server Types

As discussed elsewhere, the servers used to link identifiers to actions may be programmed to provide a variety of actions including: returning data and HTML links (e.g., in the form of an HTML document, scripts, etc.) downloading media signals in streaming or file format performing an electronic transaction (selling products like CDs, DVDs, concert tickets, etc. via computer transaction using credit cards, digital money, etc.) establishing a license to use a linked media object re-directing to another server performing database look up operations for related information, links, actions performing database look up to uniquely identify a media object based on distributor/broadcaster ID and other context information creating a transaction log This is by no means in exhaustive list. Another type of server action is to initiate a process of searching a database, a collection of databases or the Internet for additional information related to a linked media object. This type of search service may be performed continuously and the results associated with the identifier. Then, in response to a request from a decoding process, the server can return a digest of the results with links to web pages for additional information.

Communication Application

The implementation details of the communication application are highly dependent on the type of communication link and protocols used to connect the decoding process to a server. Above, an Internet browser is provided as an example.

A browser may be implemented in conventional PCs, handheld devices, wireless phones, stereo systems, set top boxes, etc. However, the communication application need not be based on computer network protocols. For wireless devices, where the marked content is played on wireless carrier frequencies, the communication application can employ wireless communication technology to forward identifiers and context information to servers that map this information to actions or metadata and return it via a wireless carrier frequency to user's handset.

Tracking Transactions and Report Generation

As depicted in FIG. 4 and described above, the servers for mapping identifiers to actions may be programmed to dispense a transaction log into a log file. A report generation process can then enable users to define and request queries of data from the log file based on a particular identifier, a particular type of context information (time frame, geographic location, user demographics, etc.), a particular action, etc.

Capture Devices

As noted above, the decoding process may be implemented in a variety of devices or software that process media objects. These devices and software include programmable devices such as personal computers, personal digital assistants, telephone handsets, set-top boxes, personal stereos, hi-fi components, tuners, receivers, televisions, etc. as well as hardwired devices that may be incorporated into these systems and devices.

In some contexts, it is useful to implement a recording function. This is particularly true in devices that receive a broadcast or stream of media content and need to capture at least a portion of it to decode an identifier. Examples of these devices are radio receivers, and wireless telephone handsets. The record function may be automatic or user activated. In the latter case, the user actuates an input device to control the record process and optionally the record duration. For example, the user may hear a song that she likes and press record. The device, in turn, records at least a part of the object that is currently being received (an audio, visual or audio visual signal). The user can then decide contemporaneously or at a later time to execute the identifier decoding process on the recorded signal. The recording function can be designed to execute for a predetermined or user specified duration.

In the case of radio and television tuners/receivers, the record function can be used to capture a media signal as it is received. In the case of a telephone handset, the record function can be used for a variety of functions, such as recording part of a telephone conversation, recording speech or other ambient audio through a microphone, or recording a media signal received by the handset via a wireless communication channel. The recordings can be compressed and stored in local memory on the device. In addition, they may be annotated with metadata about the media signal, such as a time stamp to show time of capture, a location stamp to show location of capture, metadata extracted from the object (in band or out of band data), etc. The location stamp may be provided by a global positioning device. Some wireless phone systems are capable of computing location of a telephone handset via triangulation. This location data may be used to provide geographic location coordinates or the name of nearby landmark, city name, etc.

The metadata may be displayed on a display device to help the user remember the context of a particular recording. In addition, it may be provided as context information along with an identifier to a server that links the identifier and context information to metadata or actions.

Transmarking

In some applications, it may be useful to convert auxiliary information embedded in a media signal from one format to another. This converting process is referred to as transmarking. Transmarking may include converting an out of band identifier like a tag in a header/footer to a watermark or vice versa. It may also involve converting a message in one watermark format to another. The process involves a decoding operating on an input media object, and an encoding of the decoded information into the media object. It may also involve a process for removing the mark originally in the input object to avoid interference with the newly inserted mark.

There are a variety of reasons to perform transmarking. One is to make the embedded information more robust to the types of processing that the media object is likely to encounter, such as converting from one watermark used in packaged media to another watermark used in compressed, and electronically distributed media, or a watermark used in radio or wireless phone broadcast transmission applications.

This type of transmarking process may be performed at various stages of a media object's distribution path. As suggest previously, an identifier in a watermark or file header/footer may be encoded at the time of packaging the content for distribution, either in an electronic distribution format or a physical packaged medium, such as an optical disk or magnetic memory device. At some point, the media signal may be converted from one format to another. This format conversion stage is an opportunity to perform transmarking that is tailored for the new format in terms of robustness and perceptibility concerns. The new format may be a broadcast format such as digital radio broadcast, or AM or FM radio broadcast. In this case, the identifier may be transmarked into a watermark or other metadata format that is robust for broadcast applications. The new format may be a compressed file format (e.g., ripping from an optical disk to an MP3 format). In this case, the identifier may be transmarked into a file header/footer or watermark format that is robust and compatible with the compressed file format.

The transmarking process may leave an existing embedded identifier in tact and layer an additional identifier into the media object. This may include encoding a new watermark that does not interfere with an existing watermark (e.g., insert the new watermark in unmarked portions of the media object or in a non-interfering transform domain). It may also include adding additional or new identifier tags to headers or footers in the file format.

Amplifying an Embedded Identifier

Rather than converting embedded data to another format, an amplifying process may be used to renew an identifier that has become weakened or separated due to processing of the media object in which it is embedded. In this case, an decoder and encoder pair may be used to determine the current identifier and re-encode it. Of course, the encoder can also choose to embed a new or additional identifiers as well.

If the previous identifier is lost, the encoder can query an identifier database established in the registration process, passing identifying information about the media object. The database uses the identifying information to find an associated identifier and returns it to the encoder for embedding in the media object.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above. These patents and patent applications provide additional implementation details. They describe ways to implement processes and components of the systems described above. Processes and components described in these applications may be used in various combinations, and in some cases, interchangeably with processes and components described above.

The particular combinations of elements and features in the above-detailed embodiments are exemplary only; the interchanging and substitution of these teachings with other teachings in this and the incorporated-by-reference patents/applications are also contemplated.

APPENDIX B

Specification of Application Ser. No. 09/620,019, with Re-Numbered Figs.

Using Embedded Data with File Sharing

This application relates to Utility patent application Ser. No. 09/404,291 filed Sep. 23, 1999 by Kenneth L. Levy, and Ser. No. 09/404,292 filed Sep. 23, 1999 by Kenneth L. Levy, which are incorporated herein by reference.

Technical Field

The invention relates to file sharing systems for computer networks such as the Internet, and specifically relates to using embedded data in files to enhance such systems.

Background and Summary

With the explosive growth of the Internet, file-sharing programs have evolved. One popular file sharing program is known as Napster, with a user base that has grown to between 10 and 20 million users in 1 year. This is one of the fastest growing products today. Currently, scores of music files can be found from Napster's database of current online users, and downloaded from another user's computer, in a data transfer scheme known as peer-to-peer file sharing. File-sharing is easily extended to all content, such as done with Scour.com.

In the Napster system, web site servers store a database of directories of the digital music libraries on the hard drives of thousands of registered users. The digital files of the songs themselves remain on the users' hard drives. If a user wants a particular song title, he logs onto the Napster web site and types in a search query for the title. Client software on the user's computer connects to the Napster server and receives a list of active users who have the requested file on their computer. In response to selecting a handle name, the client software opens a link between the user's computer and the computer of the selected user, and the client software executing on the two computers transfer the requested file.

Many new file-sharing systems are evolving in which the database is dynamic and not stored on a central server. One example of software with a dynamic database is known as Gnutella. Initially, when a user logs on to the Gnutella network, the user downloads client software from a Gnutella website. Next, the user types in the Internet address of an established Gnutella user (e.g., from a listing available at the web site). The client software then transmits a signal on the network that informs other computers in the Gnutella file sharing network of its network address and connection status. Once a link with the other computer is secure, the other computer informs other computers of the Gnutella network that it has encountered in previous sessions of the user's presence (e.g., address and connection status).

After this initial session, the client software stores the addresses of other computers that it has encountered in the Gnutella network. When the client software is loaded, it recalls these addresses and attempts to reconnect with the other computers located at these addresses in the Gnutella network. The Gnutella software enables users to exchange many types of files. It enables users to issue a search request for files containing a desired text string. In response, the Gnutella clients connected with the user's computer search their respective hard drives for files satisfying the query. The client on the user's computer receives the results (e.g., files and corresponding addresses) and displays a list of them. By clicking on a file item in the user interface, the user instructs the client software to transfer the selected file.

In another file sharing system known as Freenet, the identity of the person downloading and uploading the files can be kept secret. Alternatively, the files could be stored on a central server, but uploaded by users such that the central server does not know the origin or true content of the files.

Unfortunately, the file-sharing methodology also allows massive piracy of any content, such as text, music, video, software, and so on. However, due to the scalability and freedom of distribution with file-sharing, it provides a powerful tool to share information. As such, the is a need for technology that facilitates and enhances authorized file sharing while respecting copyrights.

A few examples of the benefits of file-sharing follow. A file sharing system allows unknown artists to obtain inexpensive and worldwide distribution of their creative works, such as songs, images, writings, etc. As files become more popular, they appear on more of the users' computers; thus, inherently providing scalability. In other words, there are more places from which to download the file and most likely several files exist in close proximity to the downloading computer, thus improving efficiency. In addition, anonymous file-sharing, like FreeNet, foster political debate in places around the world where such debate might trigger reprisals from the government.

Current attempts to curb unauthorized file sharing include enforcement of copyright laws and use of files with content bombs. The current legal enforcement efforts allege that uses of file sharing systems violate copyright laws. Content bombs involve placing files that appear to be the correct content, but contain alternative content or viruses. For example, a MP3 file can have the middle replaced with someone saying "do not copy songs" instead of the desired music. Neither of these solutions will help the Internet grow and improve the quality of life, worldwide.

Current copy management systems allow copying, but block rendering on equipment if the person does not have rights, where rendering only refers to reading a text file, seeing an image, watching a movie, listening to an audio file, smelling a smell file, or executing a software program. Although this can limit piracy within a file-sharing system, it does not improve the system for the user. This lack of improvement stems from the fact that current copy control systems are implemented on the user's computer at the time of importing into the secure system, rendering, or moving to a portable rendering device or media, as described in the Secure Digital Music Initiative's specifications version 1 (available at http://www.sdmi.org, and incorporated by reference). In other words, current copy control systems do not check rights at the time of copying or transfer between computers. For example, the user downloads the protected file, and then finds out that he/she cannot render the file (i.e. play the song). In addition, the user does not know if the file is the correct file or complete until after downloading and attempting to render the file. More specifically, the file is encrypted by a key related to an unique identifier within the user's computer; thus, after copying to a new computer, the file cannot be decrypted. In addition, watermarks can only be used after the file has been decrypted, or to screen open (i.e. decrypted) content for importation into the user's secure management system after the file has been copied to their computer.

Another approach would be to use a database lookup to determine whether the content is allowed to be shared. For example, music in the MP3 file format can be determined whether it can be shared by the ID3 song title tag. However, this solution does not scale. Specifically, every downloaded file needs to access and search this central database, and this database's access does not improve as the file becomes more popular. In addition, the approach can be bypassed by changing the file's title tag or filename, although this makes searching more difficult.

A desirable solution includes embedding data throughout the content in which the embedded data has any of the following roles. The embedded data can have an identifier that identifies the file as the content that the user desires. The embedded data can be analyzed in terms of continuity throughout the file to quickly demonstrate that the file is complete and not modified by undesirable content or viruses. An additional role is to identify the content as something that is allowed to be shared, or used to determine the level or type of sharing allowed, such as for subscription users only.

The embedded data may exist in the header or footer of the file, throughout the file as an out-of-band signal, such as within a frame header, or embedded in the content while being minimally perceived, most importantly without disturbing its function, also known as a watermark.

In the utilization of this embedded data, the computer from which the content to be downloaded (i.e. the uploading computer) can check to make sure the content is appropriate to be uploaded when the files (e.g., music files) on this computer are added to the central database and/or when the content is requested. Similarly, the downloading computer can also check that the requested content is appropriate before or during the downloading process. An appropriate file can be defined as any of the following: the content is allowed to be shared, i.e. it is not copyright material, the file is the correct content, and that the content is complete and does not contain any viruses.

Detailed Description

Figure 6:
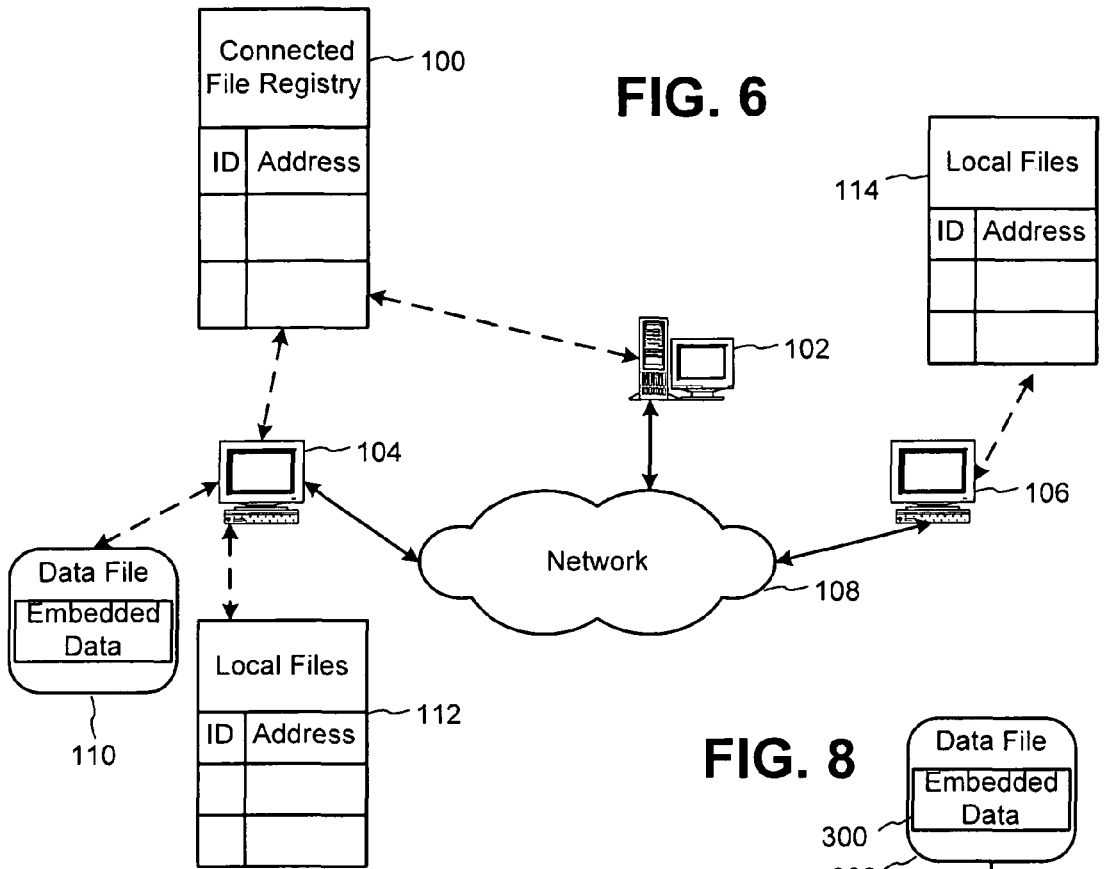
FIG. 6 is a diagram illustrating an overview of a peer-to-peer file sharing system demonstrating locations at which embedded data can be used to control file-sharing in accordance with an illustrative embodiment.

The following sections describe systems and methods for using auxiliary data embedded in files to enhance file sharing systems. FIG. 6 depicts an example of a file sharing system for a computer network like the Internet. The solution described below uses data embedded in a file to identify a file as having content desired for downloading, to verify that the content of the file is complete and free of viruses, and to allow the file to be shared among users' computers at the user's share level. In many applications, an embedding process encodes auxiliary data in the file during creation, but it may also be embedded at a later time. For example, the file may be embedded (or re-embedded) as part of a file transfer process or electronic transaction where a user is granted usage rights for the file.

Figure 7:
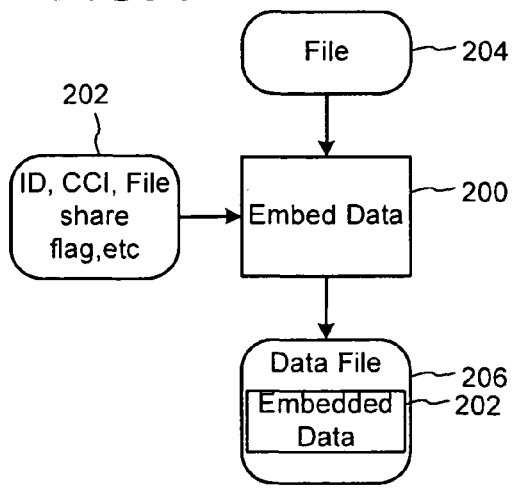
FIG. 7 is a flowchart of an embedding process in accordance with an illustrative embodiment.

FIG. 7 depicts an embedding process for adding auxiliary data to files in a file sharing system. A data embedding process 200 (e.g., steganographic encoder, file header encoder, data frame header encoder, etc.) embeds auxiliary data 202 in a file 204 to create a data file 206 including the embedded data 202. The file may then be distributed in a file sharing system comprising a number of computers or other devices in communication with each over via a network. The auxiliary data embedded in the file is used to manage file sharing operations, and to enhance the user's experience.

Types of Embedded Data

The embedded data can be placed in the header or footer of the file, throughout the file such as within frame headers, or hidden in the content itself using steganographic encoding technology such as digital watermarking. The file may contain any combination of text, audio, video, images and software, in compressed or uncompressed format.

Auxiliary data used to manage sharing of a file may be embedded in headers and footers of the file for each type. When the data is to be embedded throughout the file, the file can be broken into frames of known size, with a header for each frame including space for embedded data. For MPEG compressed audio and video, these frames already exist. The embedded data can be hidden in copyright, private or auxiliary bits. The data embedded in frame headers can be modified by the audio in any frame and/or encrypted (defined as dynamic locking in patent application Ser. No. 09/404,291, already incorporated by reference) to improve its robustness to duplication in another content file, a content bomb, or virus.

With respect to watermarking, there are many known techniques for embedding data within software, image, audio, video, and text in the state of the art, and new techniques will evolve, especially for software. Examples of steganographic encoding and decoding technologies are described in U.S. Pat. No. 5,862,260, and in co-pending patent application Ser. No. 09/503,881, filed Feb. 14, 2000. The watermark may exist only in one place in the content, several places in the content, or continuously throughout the content. For example, in an audio file, the watermark may be repeated in temporal segments of the audio track. In a still image, the watermark may be repeated in spatial segments of the image. In video, the watermark may be repeated in temporal or spatial segments of the video signal.

Roles of Embedded Data

The embedded data may include an identifier (ID) that serves as an index to an entry in a searchable database that describes or otherwise identifies the content of the file. For example, the database can include elements, where each element comprises an ID, song title, album (or CD) title, release year, and artist name. This database can be indexed by any of these elements, thus improving automated searching capabilities. Specifically, rather than needing to search for "Help and Beatles", "The Beatles—Help!", and so on, a unique ID can be used in a search query to identify The Beatles' song Help, and different IDs may be used for different releases.

The user, via an automated search program, only needs to submit a search query including that ID. When searching, the user may be presented with a drop down menu of titles of files from the database that satisfy the search query. The search program automatically knows the ID from the database so that the correct file can be found and downloaded from a computer at an address associated with that file in the database. In addition, these IDs could help music be searched by year, which is desirable to many people who want to hear music from their high school or college days.

In addition to facilitating automated searches for content in files, the ID may also be used to track these files. For example, the file transfer system can add the ID of a file to an event log when the file is transferred (e.g., downloaded, uploaded, etc.). The specific components of the file transfer system involved in the event logging process may vary with the implementation. Also, the time at which the event is triggered and logged may also vary.

The client system responsible for sending a file may issue and log an event, and either store the log locally, and/or send it to a central or distributed database for communication to other systems. The client system that receives the file may perform similar event logging actions. Additionally, if a server system is involved in a file transfer, it may also perform similar event logging actions. For example, the server may transfer the file, or facilitate the transfer between two clients, and as part of this operation, log an event of the operation including the file ID, the type of event, etc. In distributed systems where no central server is involved, the event logs can be stored on computers in the file sharing network (or a subset of the computers), and composite event logs can be compiled by having the computers broadcast their event logs to each other. Each computer, in this approach, could maintain a copy of the event log, which is synchronized upon each broadcast operation.

The embedded data, when continuously embedded throughout the content, can improve the reliability of the content by, for example, demonstrating that the content is complete and has no viruses. One way to make the embedded data continuous is to insert it in periodically spaced frame headers, or steganographically encode it at locations spread throughout the file.

A person trying to sabotage the file-sharing system can try to replicate the embedded data through a content bomb (such as audio repetitively saying "do not copy") or virus to fool the system. Thus, the harder it is to duplicate the embedded data, the more reliable the system is. When trying to resist duplication, it is advantageous to encrypt the embedded data payload, thus making it harder to duplicate. In addition, the embedded data payload can be modified by the content to improve resistance to duplication. Finally, the embedded data can be modified by the content and then encrypted for more secure applications. The above three robustness methods are labeled dynamic locking and disclosed in patent application Ser. No. 09/404,291, already incorporated by reference. When the embedded data is a watermark, meaning that it is steganographically embedded within the content and not just as auxiliary data in each frame, it is usually inherently robust to duplication because many watermarks use secret keys that are required to detect the watermark and read the information carried in it. One form of key is a pseudo-random noise (PN) sequence used as a carrier to embed, detect, and read the watermark. In particular, a spreading function is used to modulate the PN sequence with the watermark message. The resulting signal is then embedded into the host data (e.g., perceptual or transform domain data) using an embedding function. The embedding function modifies the host signal such that it makes subtle changes corresponding to the message signal. Preferably, these changes are statistically imperceptible to humans yet discernable in an automated steganographic decoding process. Encryption and changing the watermark message or PN sequence adaptively based on the content can improve the robustness of the watermark to duplication.

Importantly, header and footer structures should be of known size or protected so a hacker cannot slip a virus into the header or footer.

The embedded data can also demonstrate that the file is allowed to be shared, which means its owner has authorized copying (i.e. sharing) rights. The watermark message may include standard copy control information such as two message bits to encode copy permission states of "no more copy," "copy once" and "copy freely." In addition, only one bit can be used, thus indicating whether or not sharing, is allowed.

The copyright can be linked to other copy management systems. For example, according to the DVD-Audio specification (available at http://www.dvdforum.org) and the Portable Device Specification of the Secure Digital Music Initiative (available at http://www.sdmi.org), audio may be watermarked with copy control information. This information may automatically be passed along if encoded within a watermark robust enough to survive the compression used in most file-sharing systems. Alternatively, the watermark can be read and re-embedded as embedded data, possibly another type of watermark (as discussed in patent application Ser. No. 09/404,292, already incorporated by reference).

In addition, the copyright data can provide more information than just copy or not. For example, the bits may inform file sharing software, system or device that this file can be shared by subscription users, but not free users. Or, it can inform the level or type of subscription which allows sharing of the file. Specifically, subscription users who pay per month can share files that a free user cannot share. With music sharing, a popular band may allow only subscription users (or possibly users with an expanded subscription) to share their file so that they can earn revenue directly from the file. However, a new band may allow their song to be shared by all users.

Embedded Data Payload

The simplest form of the embedded data is a payload of one bit determining whether or not the file can be copied. A better payload is one with two bits for copy control and more bits, such as 32 bits, for a unique identifier that can be used to verify that the file contains the correct content. Note that demonstrating the file is complete does not depend upon the payload, but upon completeness of embedded data throughout the content. A decoding process can verify whether the file is complete by determining whether or not the embedded data is present at predetermined intervals or segments of the content. Finally, the payload can have a payload type, such as 8 bits, and then more bits, like 32 bits, of information that depends upon the document type and probably includes copy control and an identification section.

When the payload is to be continuously embedded with dynamic locking and it contains only a few bits, such as 1 bit, a system designer can easily convert the payload into a multibit payload for more secure dynamic locking. For example, the 1 bit payload can be represented by a 16-bit PN sequence, where a "1" is the 16-bit PN sequence and a "0" is the 16-bit complement, embedded over and over again.

General Utilization of Embedded Data for File-Sharing

Before using the embedded data in the file-sharing system, the embedded data has to be added to the content, as shown in FIG. 7. Usually, the embedded data will be added at the time of creation or purchase. Minimally, the embedded data includes a copy control bit, possibly repeated throughout the file. When repeated, the embedded data also demonstrates file continuity and completeness. Additionally, the embedded data may include an ID to identify the content.

Alternatively, the content can be watermarked when created or manufactured for public release. For perceptual content such as images, audio or video, the watermark is designed to survive the compression, such as used in a JPEG or MPEG format. Or if not made to survive certain types of compression or other processing, the watermark can be read and re-embedded in the compressed content. An advantage of the watermark is that it survives typical file conversion processes such as ripping content from a CD to another electronic file format, usually a compressed format. A related benefit is that the watermark obviates the need for the file conversion program or device to be responsible for ensuring that the embedded data remains with the content. In other words, the ripper does not need to have a decoder for the embedded data and does not need to act on embedded data.

The system, as shown in FIG. 6, may be implemented in three principal network architectures:

1. A client server model with a central database 100, like the Napster file sharing system. In this case, the database 100 is centralized on a server 102 or group of servers managed by one entity. To the clients (e.g., 104, 106) of the system, the server 102 presents a common interface for accessing and searching the database 100 and getting address information of desired files to facilitate file transfer between clients.
2. A distributed client model with a distributed database, like the Gnutella file sharing system. In this case, the database 100 is distributed among several different computers (e.g., 104, 106) on a network 108 and several copies of similar but slightly different databases may co-exist. Each database may be replicated on each client or on other computers on the network that the clients may access via conventional network communication protocols like TCP/IP and HTTP. When any registered user makes a change to one copy of the database, other copies of the distributed database may be updated using database synchronization.
3. A central server model where users upload the files to a central server 102 for downloading from there, without the server knowing what content is in the file. In other words, the central server is not moderated. The central server contains a database 100 of the files that have been uploaded and are available for downloading.

In all three architectures, in general, a client system downloads the file from another place (e.g., client 106 downloads a file 110 from client 104). In architectures (1) and (2), the other place is another user's computer, whereas in case (3) the other place is a central server. In each case, the database is searchable via an automated search program.

Figure 8:
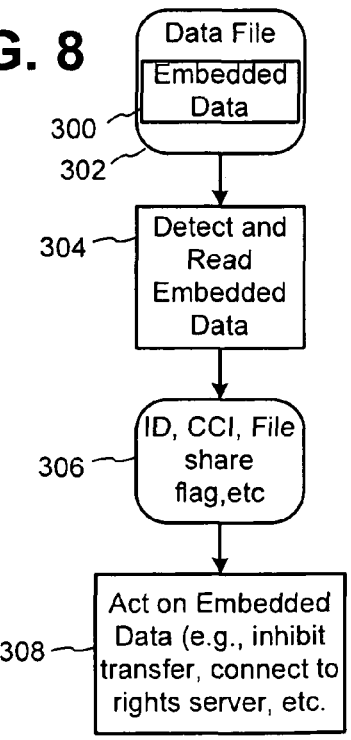
FIG. 8 is a flowchart of a detecting process in accordance with an illustrative embodiment.

FIG. 8 depicts a process for decoding embedded data from files in the file sharing system. For optimal scalability, the embedded data 300 is detected and read from a data file 302, by an embedded data decoding process 304 in the user's computer and not the network server. The decoding process, which is preferably integrated into client software of the file sharing system, returns the embedded data 306. The file sharing software in the client (and potentially on a server) then acts on the embedded data as depicted in block 308. The user's computer can be the uploading or downloading computer, or both, in architectures (1) and (2), whereas the user's computer is the downloading computer in architecture (3).

Alternatively, when registering files and a network address with the file-sharing database, the user's file sharing software can scan files for the embedded data to enable proper registration. Note that each user is provided with client software or firmware, which is provided electronically or on a portable storage device like an optical disk.

The database, for any of the above architectures, is searchable via an automated search program and maintains records of the files (MP3 files, software, documents, images, video, etc.) available for sharing from each registered user. In addition, each user may maintain a local database 112, 114 of files available for sharing, including file identifiers, other file related metadata, and address information indicating where the file resides on the user's computer system (104, 106). When the user connects to the file sharing system (e.g., connects to the network), this information is added to the database of files available for sharing (e.g., connected to file registry 100).

Both systems have a mechanism for communicating connectivity status of clients. In particular, the connectivity status indicates which clients are currently connected to the network, and are available to transfer registered files. The connectivity status information may be maintained in the same or a different database as the one that maintains records of files available for transfer along with the addresses of the clients where those files are available. The example shown in FIG. 6 shows that a database, called the connected file registry, stores identifiers and possibly other information about files available for sharing and connectivity information such as the addresses of the computers where the files reside.

All three architectures include a client system (104, 106) that acts as the interface to end users, and maintains the end user's copy of files available for sharing in the network architecture. The client system is capable of directly or directly communicating with the database 100 and is capable of obtaining connectivity status.

In one preferred embodiment, the content files such as audio, image and video files, have been marked with embedded data that conveys any or all of the following: file identification, file status, such as complete and virus free, and copy control information within the network architecture. The clients have an embedded data decoder that screens files for the presence of embedded data, and if found, determines whether the embedded data enables the desired action. Before sending or receiving a file as part of a file sharing process in the network architecture, the client checks the file transfer status and determines whether or not the file can and is the correct and complete file to be transferred.

One enhancement is to add a user interface to the client that informs the user of file transfer rights, and gives the user the opportunity to get rights that he or she desires. One way to get the rights is to connect to another computer and purchase a copy of the file with the desired file transfer rights. One way to enable this connection is to include an identifier (e.g., address, URL, name, etc.) or index to an identifier in the embedded data that instructs or otherwise enables the client to establish network communication with an e-commerce or rights transaction server. The purchased file may be transferred to the client electronically or physically shipped on packaged media, such as an optical disk, memory card, etc.

The user interface may also enable the user to get additional information about a file (e.g., a generic or customized copyright notice or other metadata) and to access another server that provides electronic purchase opportunities. For example, the user interface may facilitate a link to a server on the network that enables the user to buy a file of interest or related files. For music applications, the user can buy a music track or set of tracks, concert tickets, etc. via an electronic transaction between the client and an e-commerce server on the Internet.

Another way is to connect to another computer and purchase the rights, which in turn, are updated in the file by changing the embedded data in some fashion. The updated rights may be affected by encoding more embedded data, such as another watermark, or altering the existing embedded data, such as by removing it. Content providers or distributors pay the provider of the embedded data technology to encode files. In one embodiment, the files are watermarked at their time of creation. In addition, the content providers or distributors pay the provider of the embedded data technology per transaction when users purchase enhanced rights. There are a number of ways to track these transactions. The client software that performs encoding or decoding of the embedded data can keep a log of transactions and add the log to a central or distributed database of transactions. Alternatively, the transaction server that communicates the enhanced rights to the client can log the transaction event in a similar fashion.

Finally, if no embedded data exists, it is up to the client file sharing application to decide what to do.

Specific Example Utilization

In this specific example utilization, it is assumed that the embedded data has been added and dynamically locked (including being modified by the audio content and encrypted, as defined in patent application Ser. No. 09/404,291, already incorporated by reference) to the audio throughout the frames in all legitimate MP3 files at the time of creation. (Note that the embedded data could include an ID to identify the content and/or artist, such as could be created from CDDB's database, available at http://www.cddb.com, and incorporated by reference, but not included in this example.) For personal use, this may happen at the ripping stage, i.e. when content on an optical disk like a CD is converted into a MP3 file. For retail use, this may happen when the file is made available for sale, probably through a commercial ripper.

When a user enables a file sharing system (e.g., an enhanced version of the Napster file sharing system) to share a directory on his computer, client software on the user's computer searches for all MP3 audio files in locations (i.e. folders or directories) allowed by the user. For each audio file, the client software looks for embedded data placed throughout the frame headers of the MP3 file. The embedded data provides data that the file is allowed to be shared and is continuous from start to end. Since the embedded data is dynamically locked to the audio, thus extremely difficult to duplicate, it is presumed that no viruses or audio bombs have been substituted. Now, the client software establishes a connection with a central database, and transfers to the central database the artist and song title of each song due to its ID3 tags, that the file can be shared, and that it is a "safe" file. (Note that the artist and song title can be identified by the embedded data ID and a secondary database, as discussed above, but not implemented in this example.) In addition, if no embedded data exists, it is up to the application to decide whether to allow file sharing. The application would not want to display a "safe" icon.

Next, when the user is connected to the file sharing system, the central database activates his songs (e.g., adds them to the connected file registry 100). If someone else's search locates this user's songs, they can download the songs from his computer and know they have rights and that the song is "safe" by some identifying feature displayed in the UI of the client software, such as a "safe" icon.

However, if a user wants to foil the system, he may have tried to replace the file with a file of the same size and name. In this case, the client software can do any or all of the following to improve its reliability. It may want to verify that the embedded data still exists and is complete before allowing uploading. Or, the requesting/downloading client software may ask the user's client software for the embedded data. This uploading-side security and client-to-client exchange is more difficult to trick since it involves changing object code of the client software, but not impossible since the exchange includes using software available on the computer of the person desiring to sabotage the system. In addition, the requesting/downloading client application may want to check the embedded data as the file is downloaded. Bypassing this last downloading-side security feature is the most difficult since it happens on a computer not available to the person desiring to sabotage the system and the embedded data is secure.

In an alternative example, the embedded data could be a watermark placed in the original CD or DVD audio, and which survives compression and is used in other copy management systems, such as designed by DVD-A and the Secure Digital Music Initiative (SDMI). In this case, the enabling and usage of the file-sharing system would be similar. It is mainly the embedding process that is different.

Using the Embedded Data to Link to Additional Information or Actions

In addition to the roles of the embedded data described above, the embedded data may also be used to link additional information or actions to a file. For example, the embedded data may carry an address or an index to an address of additional information or a program related to the file. The embedded data may trigger the decoding application to fetch the additional information or execute the linked action automatically. Alternatively, the decoding application may present a user interface to the user, giving the user the option to instruct the computer to fetch additional information or launch a program associated with the file via the embedded data.

The additional information may be rendered to the screen (e.g., a web page, graphical image, video) or rendered to an audio output device (e.g., a sound clip). The additional information may represent a graphical brand identifier, copyright notice, web page or link to a web page, etc. Visual information or program instructions linked to a file may be used to create a user interface that controls how the user interacts with the file. The user interface may include graphical icons that act as hot links to web pages or programs, user interface controls that enable the user to control rendering or transfer of the file from which the embedded data was extracted. For example for a music file, the user interface controls could enable the user to control playback of the file. These user interface controls may create a unique user interface for each file or customize a media player, such as Windows Media Player, Real Player from Real Networks, WinAmp from America OnLine, for that file.

In one usage scenario, the client system extracts this embedded data and presents a user interface to the user asking him if he wants additional information about the file. In the case of a music file, the client system could display a link to additional information or a related action as the music file is being transferred or rendered. Specifically, the embedded data could be used as an index to a URL of a web site that provides more information or opportunities to buy the music or related products or services via an electronic transaction.

A database mapping embedded data to additional information or actions could be stored in the client system, a remote computer or device connected via a network, or a combination of both. The client system may be programmed to automatically look up corresponding information or actions in response to decoding the embedded data. The information or actions in this case may include displaying a user interface with links to additional information, programs, etc. (e.g., links to web sites, or programs that execute when the user selects the link). Alternatively, it may include fetching related information or programs that is rendered or executed automatically while the file is being transferred or rendered. For example, the embedded data in a music file might link to video or image data that is rendered as the music is being rendered. Also, the embedded data might also link to a web site where the user can buy the content, license usage rights in the content, or buy or purchase related content, products or services. For more information about these types of applications see co-pending patent application Ser. No. 09/563,664 entitled Connected Audio and Other Media Objects filed May 2, 2000, and Ser. No. 09/571,422 entitled Methods and Systems for Controlling Computers or Linking to Internet Resources from Physical and Electronic Objects filed May 15, 2000, Ser. No. 09/574,726, entitled Methods and Systems Employing Digital Watermarking filed May 18, 2000, which are hereby incorporated by reference.

Using Fingerprints to Enhance Searching and Tracking of Files

Just as embedded data enhances file sharing systems, fingerprints can also provide additional functionality. Fingerprints refer to unique identifiers that are derived from the content of the file. For example, a fingerprint can be computed from an audio, image or video signal stored in a file by hashing the data representing that signal into a unique identifier. The unique identifiers for files are stored in a database that associates information, and in some cases, automated actions, with the unique identifiers. Such fingerprint technology is currently used to identify audio and video signals for broadcast monitoring applications, and can be used for applications described in this document.

Fingerprints may be computed for media files, like image, audio, and video files, and stored in a database along with information or actions associated with the files. This database enables files to be associated with related information or actions as described in the previous section.

For example, file sharing software executing on the client computes the fingerprint for a file recently received or sent in the file sharing system. As part of the file sharing process, the file sharing software computes the fingerprint and sends it to a database system, which is located at a central server or distributed in the file sharing network. In response, the database system returns related information, or performs an action related to the fingerprint, such as logging an event, linking to another computer (e.g., a web site that returns information to the sending or receiving computer, a licensing server that sends a web page to the sending or receiving computer with licensing information or usage control rules), streaming a media signal (e.g., streaming audio or video) to the sending or receiving computer, etc.

The fingerprint augments file searching and tracking in the system because files can be searched or tracked based on their fingerprint. For example, the user could instruct the file sharing system to return a list of related files to a file in question. In response, the file sharing software computes a fingerprint of the file in question, sends it to a search engine, which in turn, returns a list of files and related information linked to that fingerprint in a database. Also, to track usage or transfer of a file, the file sharing system can log the fingerprint of a file when it is transferred or used as described previously.

Concluding Remarks

Having described and illustrated the principles of the technology with reference to specific implementations, it will be recognized that the technology can be implemented in many other, different, forms. To provide a comprehensive disclosure without unduly lengthening the specification, applicant incorporates by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device). Additionally, content encoded with auxiliary data used in file sharing may be distributed on packaged media, such as optical disks, flash memory cards, magnetic storage devices, or distributed in an electronic file format.

The particular combinations of elements and features in the above-detailed embodiments are exemplary only; the interchanging and substitution of these teachings with other teachings in this and the incorporated-by-reference patents/applications are also contemplated.

I claim:

1. A method comprising:
   downloading a video advertisement to a personal video recorder;
   analyzing, by a processor of the personal video recorder, video content provided to a device in communication with the personal video recorder to detect a broadcast advertisement having an embedded character, wherein the embedded character is a fingerprint; and
   replacing, by the processor, the broadcast advertisement having the embedded character with the video advertisement downloaded to the personal video recorder so that a display of the device presents the video advertisement rather than the broadcast advertisement.

2. The method of claim 1, further comprising downloading plural video advertisements to the personal video recorder, wherein the replacing comprises replacing the broadcast advertisement with a selected one of the plural downloaded video advertisements, and wherein the selection is based on a subject matter of non-advertisement video content in which the broadcast advertisement was detected.

3. The method of claim 1, further comprising downloading plural video advertisements to the personal video recorder, wherein the replacing comprises replacing the broadcast advertisement with a selected one of the plural downloaded video advertisements, and wherein the selection is dependent on a time of day.

4. The method of claim 1, wherein the analyzing further comprises detecting a digital watermark steganographically encoded in the broadcast advertisement.

5. A method comprising:
   downloading plural advertisements to a personal video recorder;
   discerning, by a processor of the personal video recorder, a behavior of a user relating to advertisement viewing, wherein the behavior is discerned at least in part using an embedded character in video content; and
   inserting, by the processor, one or more advertisements from the plural advertisements into the video content for presentation to the user, wherein the insertion is based at least in part on the discerned behavior.

6. The method of claim 5, wherein the discerning comprises identifying a class of advertisement that the user apparently does not watch.

7. The method of claim 5, wherein the discerning comprises identifying a class of advertisements that the user apparently watches.

8. The method of claim 5, wherein the discerning comprises identifying a class of advertisements relating to a given subject.

9. A method comprising:
   presenting video content, including advertising, on a display device;

tracking, by a processor in communication with the display device, an amount of advertising that is apparently viewed on the display device; and changing the presentation of advertising based on the tracked amount of advertising apparently viewed on the display device.

10. The method of claim 9, wherein the tracking comprises counting a number of apparently-watched advertisements by a particular viewer, and wherein the changing comprises changing a frequency of advertisements based on the counted number.

11. The method of claim 10, wherein the changing comprises presenting no further advertisements for a predetermined period of time after a threshold number of apparently-watched advertisements has been reached.

12. The method of claim 10, further comprising:
delivering one or more advertisements to a personal video recorder; and
inserting the one or more advertisements into the video content.

13. A method comprising:
deriving fingerprint data from compressed video content broadcast to a display device; and
triggering, by a processor in communication with the display device, advertisement insertion into the video content based at least in part on the derived fingerprint data.

14. The method of claim 13, wherein the advertisement is inserted from a personal video recorder (PVR) storage device.

15. The method of claim 13, further comprising providing the advertisement on an optical storage disk, and wherein the advertisement is inserted into the video content from the optical storage disk.

16. The method of claim 13, further comprising identifying the advertisement to insert from a plurality of advertisements based at least in part on a rule set, wherein parameters of the rule set comprise one or more of a time of day, data indicating advertisements previously shown, and data indicating a subject matter of the video content.

17. The method of claim 9, wherein tracking the amount of advertising comprises tracking the amount of advertising that is apparently skipped by fast-forwarding.

18. A non-transitory computer-readable medium having instructions stored thereon, the instructions comprising:
instructions to download plural advertisements to a personal video recorder;
instructions to discern a behavior of a user relating to advertisement viewing, wherein the behavior is discerned using an embedded character in video content; and
instructions to insert one or more advertisements from the plural advertisements into the video content for presentation to the user, wherein the insertion is based at least in part on the discerned behavior.

19. A non-transitory computer-readable medium having instructions stored thereon, the instructions comprising:
instructions to present video content, including advertising, on a display device of a consumer;
instructions to track an amount of advertising the consumer apparently views; and
instructions to change the presentation of advertising based on the tracked amount of advertising apparently viewed by the consumer.

20. A non-transitory computer-readable medium having instructions stored thereon, the instructions comprising:
instructions to derive fingerprint data from compressed video content; and
instructions to trigger advertisement insertion into the video content based at least in part on the derived fingerprint data.

21. The method of claim 1, wherein the fingerprint comprises selected frames of the broadcast advertisement based on a known key, and further comprising performing a lossy transformation on the selected frames.

22. The method of claim 1, wherein the video content has a start point, and further wherein discerning the behavior comprises:
beginning the presentation of the video content to the user at a non-starting point in the video content;
tracking an elapsed time between the non-starting point in the video content and a current presentation point in the video content; and
inserting the one or more advertisements when the elapsed time has reached a certain threshold.

* * * * *